United States Patent
Aalund et al.

(10) Patent No.: US 9,990,521 B2
(45) Date of Patent: Jun. 5, 2018

(54) BUNDLED UNIT IDENTIFICATION AND TRACKING

(71) Applicant: Amazon Technologies, Inc., Seattle, WA (US)

(72) Inventors: Martin Peter Aalund, Seattle, WA (US); Jon Stuart Battles, North Bend, WA (US); Michael Barrett Hill, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/257,806

(22) Filed: Sep. 6, 2016

(65) Prior Publication Data

US 2018/0068139 A1    Mar. 8, 2018

(51) Int. Cl.
| | |
|---|---|
| *G06K 7/14* | (2006.01) |
| *G06K 7/10* | (2006.01) |
| *G06K 9/20* | (2006.01) |
| *G06Q 10/08* | (2012.01) |

(52) U.S. Cl.
CPC ....... *G06K 7/10722* (2013.01); *G06K 7/1413* (2013.01); *G06K 7/1417* (2013.01); *G06K 9/20* (2013.01); *G06Q 10/0832* (2013.01); *G06Q 10/0833* (2013.01)

(58) Field of Classification Search
CPC .. G06Q 10/08; G06Q 10/083; G06Q 10/0832; G06Q 10/0833; G06Q 10/087; G06K 9/20; G06K 7/1413; G06K 7/1417
USPC ............................................ 235/385; 705/28
See application file for complete search history.

(56) References Cited

U.S. PATENT DOCUMENTS

| | | | |
|---|---|---|---|
| 6,547,137 B1 * | 4/2003 | Begelfer ............ | G06K 17/0029 235/380 |
| 7,689,465 B1 | 3/2010 | Shakes et al. | |
| 7,769,221 B1 * | 8/2010 | Shakes ..................... | B07C 3/14 382/141 |
| 9,248,965 B1 | 2/2016 | Kritchevsky | |
| 9,298,997 B1 | 3/2016 | Lecky | |
| 9,826,213 B1 * | 11/2017 | Russell .............. | H04N 13/0203 |
| 2006/0098842 A1 | 5/2006 | Levine | |
| 2006/0131405 A1 * | 6/2006 | Schneider ............... | G01S 13/75 235/385 |

(Continued)

OTHER PUBLICATIONS

International Search Report and Written Opinion for PCT Application No. PCT/US2017/048758 dated Nov. 2, 2017.

*Primary Examiner* — Suezu Ellis
(74) *Attorney, Agent, or Firm* — Athorus, PLLC

(57) ABSTRACT

A unique digital identifier of a bundled set of items may be generated based on imaging data or other information captured from the bundled set, stored, and used for any purpose. The imaging data or other information may depict or describe the bundled set after the items have been wrapped or otherwise combined in a unique manner using a binding agent, e.g., a sheet of shrink wrap, a rubber band, or any other materials. Unique digital identifiers of bundled sets of items may be stored in association with information regarding the items. When a bundled set of items is recognized based on its unique digital identifier, information regarding the bundled set may be accessed and used for any purpose, such as to identify a common container for the bundled set based on attributes of any of the items or an order with which the bundled set is associated.

22 Claims, 20 Drawing Sheets

(56) References Cited

U.S. PATENT DOCUMENTS

| | | | |
|---|---|---|---|
| 2008/0306841 A1* | 12/2008 | Chang, II | G06Q 10/08 |
| | | | 705/28 |
| 2011/0315760 A1* | 12/2011 | Ito | G07D 11/0021 |
| | | | 235/375 |
| 2012/0057022 A1* | 3/2012 | Nechiporenko | G06K 9/209 |
| | | | 348/135 |
| 2012/0134572 A1* | 5/2012 | Demmeler | B65B 69/0025 |
| | | | 382/135 |
| 2015/0102100 A1 | 4/2015 | Hattrup et al. | |
| 2015/0379347 A1 | 12/2015 | Mishra et al. | |
| 2017/0132773 A1* | 5/2017 | Toedtli | G06T 7/001 |

* cited by examiner

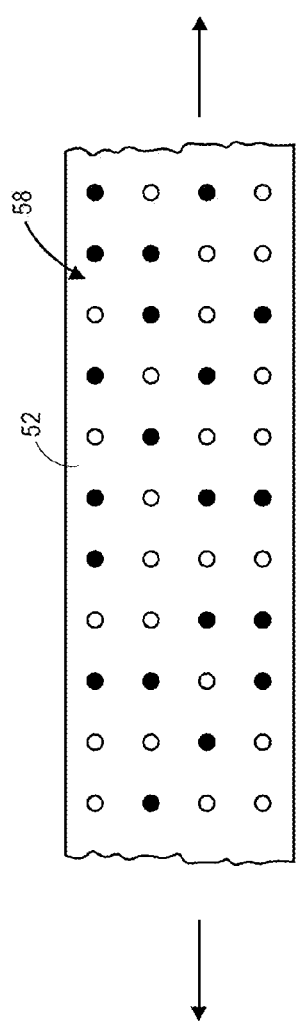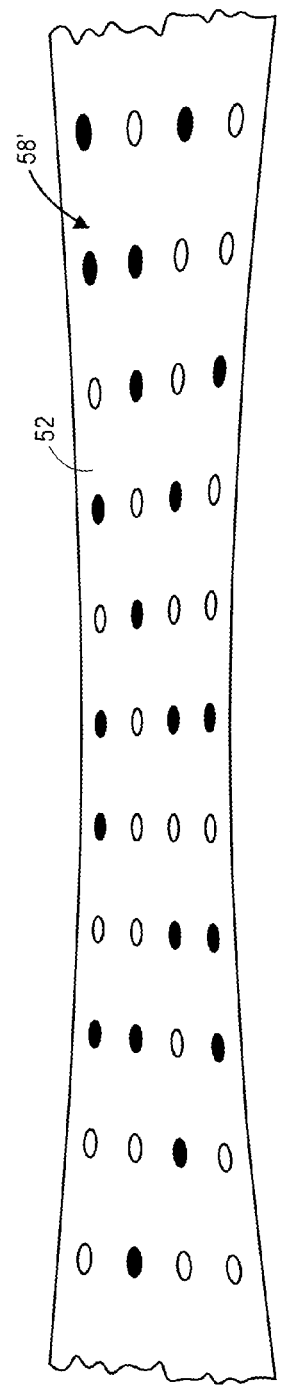
FIG. 5A
FIG. 5B

BUNDLED UNIT IDENTIFICATION AND TRACKING

BACKGROUND

Contemporary online marketplaces offer a wide variety of groups or types of items (including goods, services, information and/or media of any type or form) to customers who may be located in virtually any area of the globe, in any number of ways. Such items may be delivered to a fulfillment center, a warehouse or another facility operated by the online marketplace by one or more sellers, vendors, manufacturers or other sources. Upon the shipments' arrival, each of the items may be registered, such as by locating a standard identification number (e.g., a Stock Keeping Unit number, or SKU; a Universal Product Code, or UPC; or an International Article Number, or EAN) associated with each of the items, or assigning a custom identification number to each of the items, and storing an indication that each of the items has arrived based on its identification number in one or more data stores. Thereafter, the items may be associated with one or more product detail pages, and such pages may be made available to customers over the Internet. When a customer places an order for one or more of the items, the online marketplace may package the ordered items for delivery to the customer, process any necessary transactions, and arrange for the ordered items to be delivered to the customer.

In many instances, when a customer orders multiple items for delivery from an online marketplace, the multiple items may be delivered to the customer together in a common package. For example, where a customer is an avid golfer, he or she may order a new pair of golf shoes, a sleeve of new golf balls and a new putter from an online marketplace. In some scenarios, upon receiving an order for multiple items, a fulfillment center, a warehouse or another facility that is in possession of the items may bundle the items together at a preparation station, e.g., using tape, ribbons, bags, boxes, adhesives or other binding materials, and transfer the bundled items to a distribution station, e.g., on a conveyor, in a bin, or by any other means, where the bundled items may be deposited into a container with a sufficient amount and type of dunnage for shipping to a destination specified by the customer.

Commercial items are commonly identified by external markings provided on external surfaces of the items or their packaging. Some such markings include bar codes (e.g., one-dimensional or two-dimensional codes, such as "QR" codes), letters, numbers, symbols or other characters in any type or number of combinations. Where multiple items are bound in a bundle using one or more binding materials, the external markings (e.g., a SKU, a UPC, an EAN, or any other characters) on one or more of the items may be concealed or obscured by the binding materials or by other items, which may significantly complicate the identification and tracking of the bundle throughout a fulfillment center, a warehouse or another facility.

Moreover, while standard or custom identification numbers are commonly assigned to items, such numbers are not often assigned to bundles of items, for at least two reasons. First, bundles of items may be theoretically unlimited in number. Second, incorporating an identification number to a bundle of items, e.g., applying an adhesive label or tape including the identification number or any other characters or symbols or markings to the bundle, or affixing a radio frequency identification (or "RFID") device or tag to the bundle, is logistically challenging and may require the bundle of items to be slowed or halted for a brief period of time, thereby inherently delaying the delivery of the bundle to the customer.

BRIEF DESCRIPTION OF THE DRAWINGS

FIGS. 5A, 5B and 5C are views of aspects of a system for bundled unit identification or tracking in accordance with embodiments of the present disclosure.

DETAILED DESCRIPTION

Figure 1A:
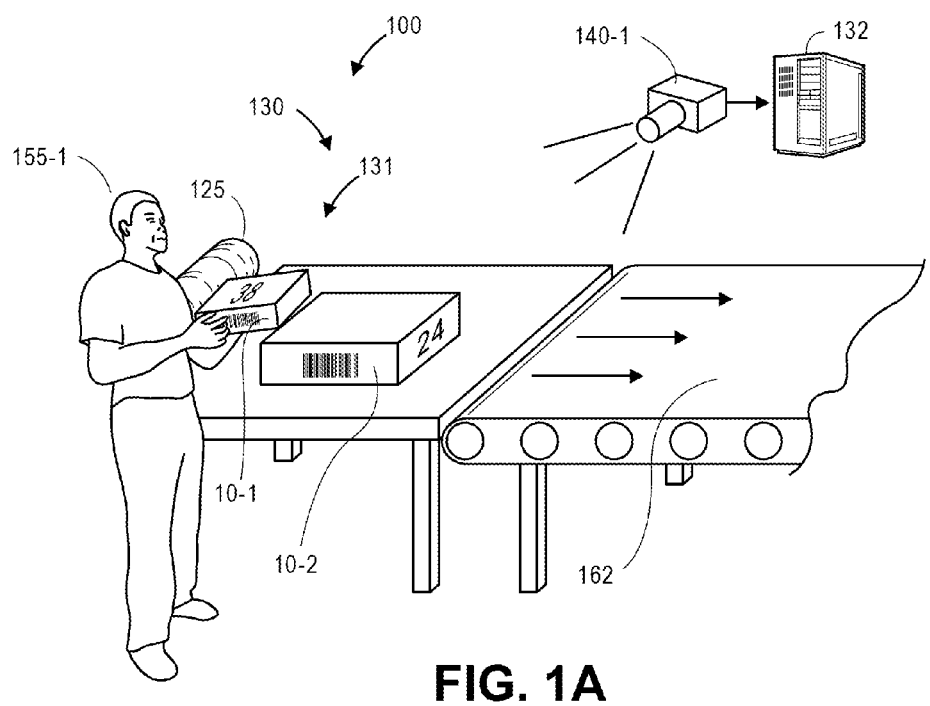
FIGS. 1A through 1H are views of aspects of a system for bundled unit identification or tracking in accordance with embodiments of the present disclosure.

As is set forth in greater detail below, the present disclosure is directed to systems and methods for identifying and tracking bundles of units, e.g., one or more commercial goods or other items. More specifically, embodiments of the present disclosure are directed to wrapping an item or multiple items with one or more binding agents or layers, and automatically formulating an electronic "fingerprint," "signature" or other digital identifier of a bundle including the item or items based at least in part on the layers or agents with which such items are bound. For example, where a plurality of items is wrapped into a bundle using one or more binding agents or layers, imaging data (e.g., one or more still or moving images) or other information or data regarding the bundle may be captured and processed to generate a digital identifier of the bundle. The digital identifier of the bundle of items may be of any form, including a series of digits or other characters or an actual visual representation of one or more aspects of the bundle of the items, e.g., a two-dimensional visual image or a three-dimensional depth image (or point cloud) of one or more portions of the bundle.

Once a digital identifier has been generated based on imaging data or other information or data captured therefrom, the digital identifier may then be stored in association with one or more attributes of the bundle, the individual items, or an order for the items received from a customer, in one or more data stores. Such attributes may include, but are not limited to, intended destinations or shipping requirements for the bundle or for individual items of the bundle.

Subsequently, the bundle may be recognized based on imaging data or other information or data captured from the bundle, e.g., by processing imaging data and comparing the processed imaging data to one or more digital identifiers of bundles of items on a probabilistic basis. For example, in some embodiments, a digital identifier may be generated for a bundle of items based on one or more images captured of the bundle of items at a first station or location of a fulfillment center, a warehouse or a like facility and stored in one or more records in a database or other data store along with any relevant information or data regarding the bundle or the items included therein.

Thereafter, the bundle may be transported (e.g., conveyed) to a second station or location of the fulfillment center, where the bundle may be recognized by capturing and processing one or more images of the bundle, comparing the processed images to each of a plurality of digital identifiers stored in records of the database and selecting one of the digital identifiers that most closely matches one of the processed images. For example, the images of the bundle captured at the second station or location may be used to generate a digital identifier therefrom, e.g., in the same manner that the digital identifier was generated based on the images of the bundle captured at the first station or location. If the digital identifier generated based on the images of the bundle captured at the first station or location is sufficiently similar to the digital identifier generated based on the images of the bundle captured at the second station or location, e.g., to a sufficiently high degree of confidence or accuracy, the bundle at the second station or location is recognized as the bundle from the first station or location. Alternatively, where a bundle may not be recognized based on a comparison of digital identifiers, or where two or more digital identifiers have equally or sufficiently high probabilities of a match with a digital identifier of a given bundle, additional information or data that may be known regarding the respective bundles or items therein may be considered and evaluated in order to select the digital identifier having the highest probability of a match, and to recognize the bundle accordingly. After the bundle has been recognized as such, the attributes of the bundle, the individual items or the order may be retrieved based on the digital identifiers.

The systems and methods of the present disclosure are thus directed to efficiently identifying and tracking bundles of units based on digital identifiers (e.g., fingerprints or signatures) derived based on imaging data, or other information or data, gathered from the bundles after the units have been combined by one or more external layers. The digital identifiers may be permanently associated with a given bundle, or, alternatively, limited for use within a given context, e.g., between a first time when a bundle is formed and a second time when the bundle is routed to an intended destination, including but not limited to a station or other location within a facility where the bundle is to be prepared for delivery to a given customer, and may be deleted or otherwise discarded shortly thereafter.

Referring to FIGS. 1A through 1H, aspects of one system 100 for bundled unit identification or tracking in accordance with embodiments of the present disclosure are shown. As is shown in FIG. 1A, the system 100 includes a fulfillment center 130 having a first working station 131 (e.g., a preparation station). The first working station 131 includes an imaging device 140-1 and a conveyor 162. The first working station 131 also includes a working surface and a supply (e.g., a roll) of binding agent 125, which may be any paper, plastic, rubber, metallic or semi-metallic materials, such as shrink wrap (e.g., a polymeric plastic film), bubble wrap, rubber bands, adhesives, sheets of cellophane, paper or metallic or semi-metallic foils, or the like. The imaging device 140-1 includes substantial portions of the first working station 131 within a field of view, and is in communication with a computer server 132, e.g., over a communications network such as an intranet or portions of the Internet. Alternatively, the first working station 131 may include a plurality of imaging devices, in addition to or including the imaging device 140-1, and such imaging devices may be aligned in any configuration or orientation with respect to working surfaces or other features at the first working station 131, or on any other basis.

Figure 1B:
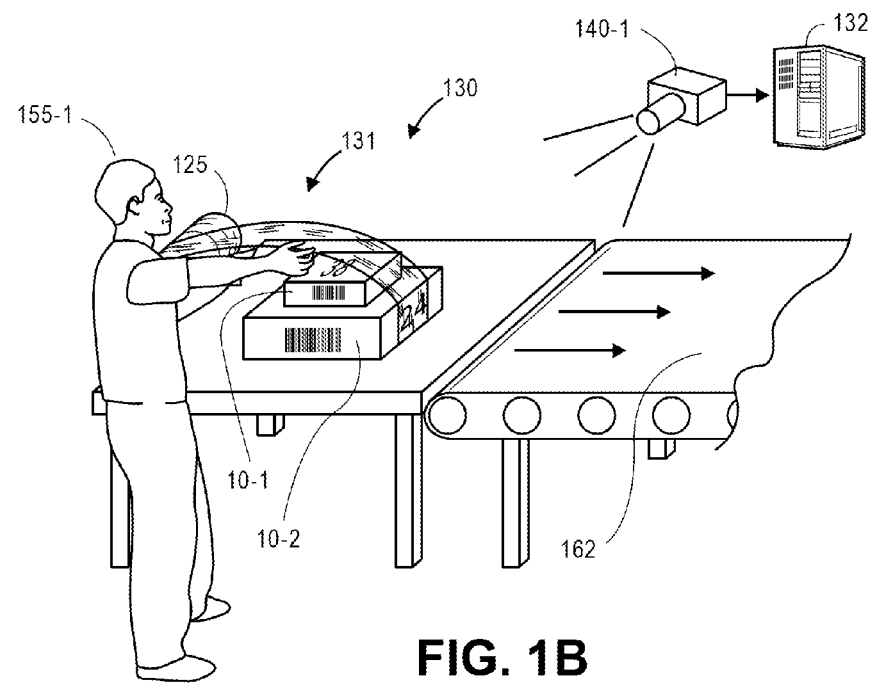

As is also shown in FIG. 1A, a worker 155-1 is preparing to combine an item 10-1 and an item 10-2 into a bundle. Each of the items 10-1, 10-2 includes one or more markings or identifiers on external surfaces, including one or more characters (e.g., letters, numbers or symbols) and/or bar codes. As is shown in FIG. 1B, the worker 155-1 forms a stack of the item 10-1 and the item 10-2, draws a length 12 of the binding agent 125, and wraps the length 12 of the binding agent 125 around the items 10-1, 10-2.

Figure 1C:
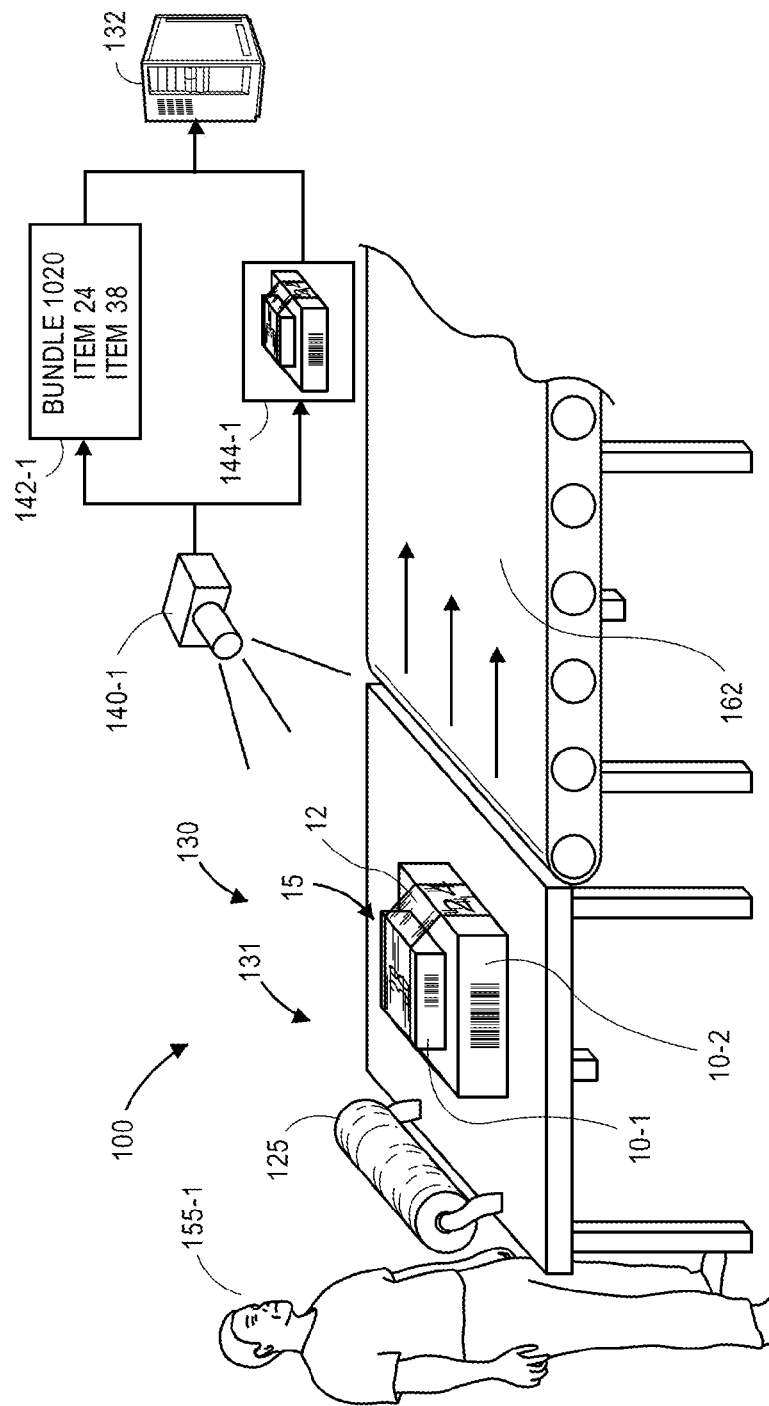
Figure 1D:
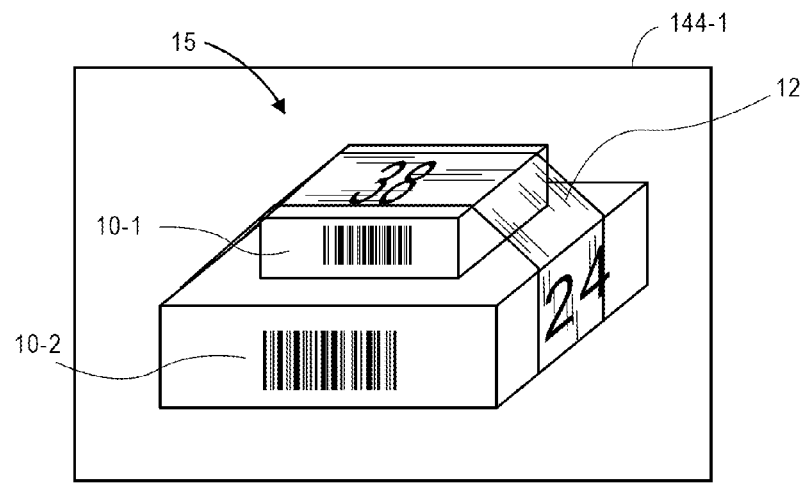

As is shown in FIG. 1C and FIG. 1D, a bundle 15 has been formed from the items 10-1, 10-2, by wrapping the length 12 of the binding agent 125 around the items 10-1, 10-2 at the first working station 131 sufficiently tightly to join the items 10-1, 10-2 together. Alternatively, the bundle 15 may be formed by wrapping the length 12 of the binding agent 125 around a single item, e.g., one of the item 10-1 or the item 10-2, or around any number of other items (not shown). After the bundle 15 has been formed, the imaging device 140-1 may capture or otherwise determine information 142-1 regarding the bundle 15 (e.g., a name or other identifier of the bundle, or of the individual items 10-1, 10-2) and an image 144-1 (or multiple images) of the bundle 15, and the information 142-1 and the image 144-1 may be transferred to the computer server 132 and stored along with information and/or images of any number of other bundles that are known to be present at the fulfillment center 130. For example, the image 144-1 may be processed in order to identify one or more features expressed therein, including one or more edges, contours, outlines, colors, textures, silhouettes, shapes or other characteristics of objects, or portions of objects, expressed therein.

As is shown in FIG. 1D, the image 144-1 indicates that the length 12 of the binding agent 125 is tightly wrapped around a circumference or about an axis of the stack of the items 10-1, 10-2 in a manner that effectively joins the items 10-1, 10-2 to form the bundle 15. Alternatively, two or more lengths of the binding agent 125 may be wrapped around the same circumference or about the same axis of the stack, or around different circumferences or about different axes of the stack. Any number of images, in addition to or including the image 144-1, of the bundle 15 may be captured by the imaging device 140-1 or one or more other imaging devices (not shown).

Figure 1E:
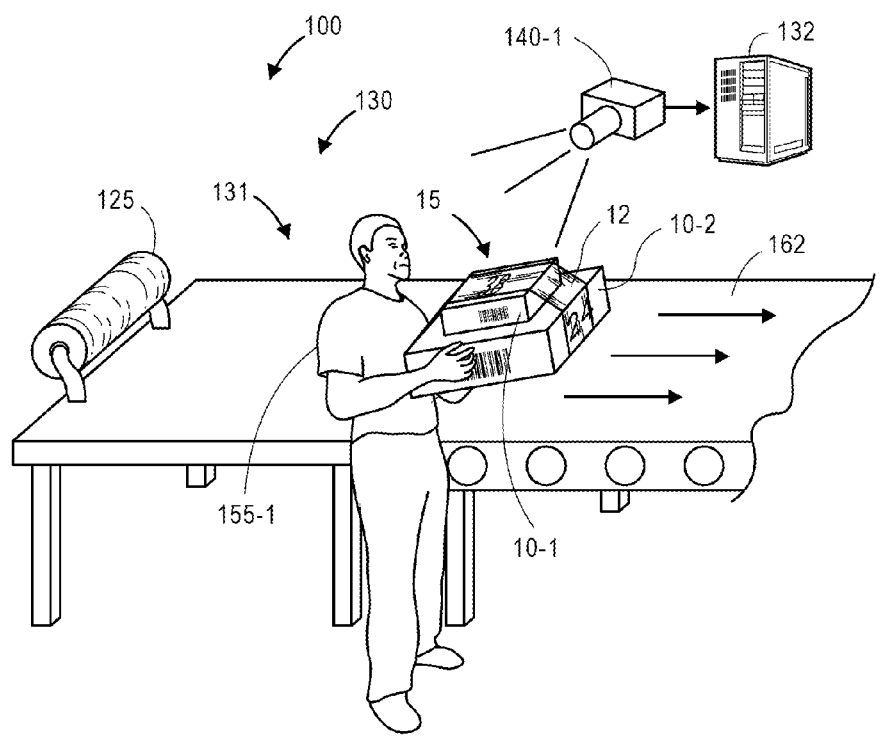

As is shown in FIG. 1E, after the bundle 15 has been formed by wrapping the length 12 of the binding agent 125 around the circumference of the stack of the items 10-1, 10-2, and the information 142-1 and the image 144-1 of the bundle 15 have been captured or determined by the imaging device 144-1, the worker 155-1 places the bundle 15 onto the conveyor 162 for delivery to a second working station 133 (e.g., a packing station) of the fulfillment center 130. The packing station 133 also includes an imaging device 140-2 and a computer display 165. The imaging device 140-2 is in communication with the computer server 132, and includes portions of the conveyor 162 within a field of view.

As the bundle 15 arrives at the second working station 133, the imaging device 140-2 may capture an image 144-2 (or multiple images) of the bundle 15, and transfer the image 144-2 to the computer server 132. At the computer server 132, the image 144-2 may be processed in order to identify one or more features expressed therein, including one or more edges, contours, outlines, colors, textures, silhouettes, shapes or other characteristics of objects, or portions of objects, expressed in the image 144-2. For example, the image 144-2 may be processed in order to identify portions thereof corresponding to the length 12 of the binding agent 125, along with portions thereof corresponding to the items 10-1, 10-2, as well as portions thereof corresponding to background features (e.g., the conveyor 162). Thereafter, the image 144-2 may be compared to any images of bundles or portions thereof that are stored or available at the computer server 132, in order to confirm an identity of the bundle 15 and determine any other relevant information regarding the bundle 15.

Figure 1F:
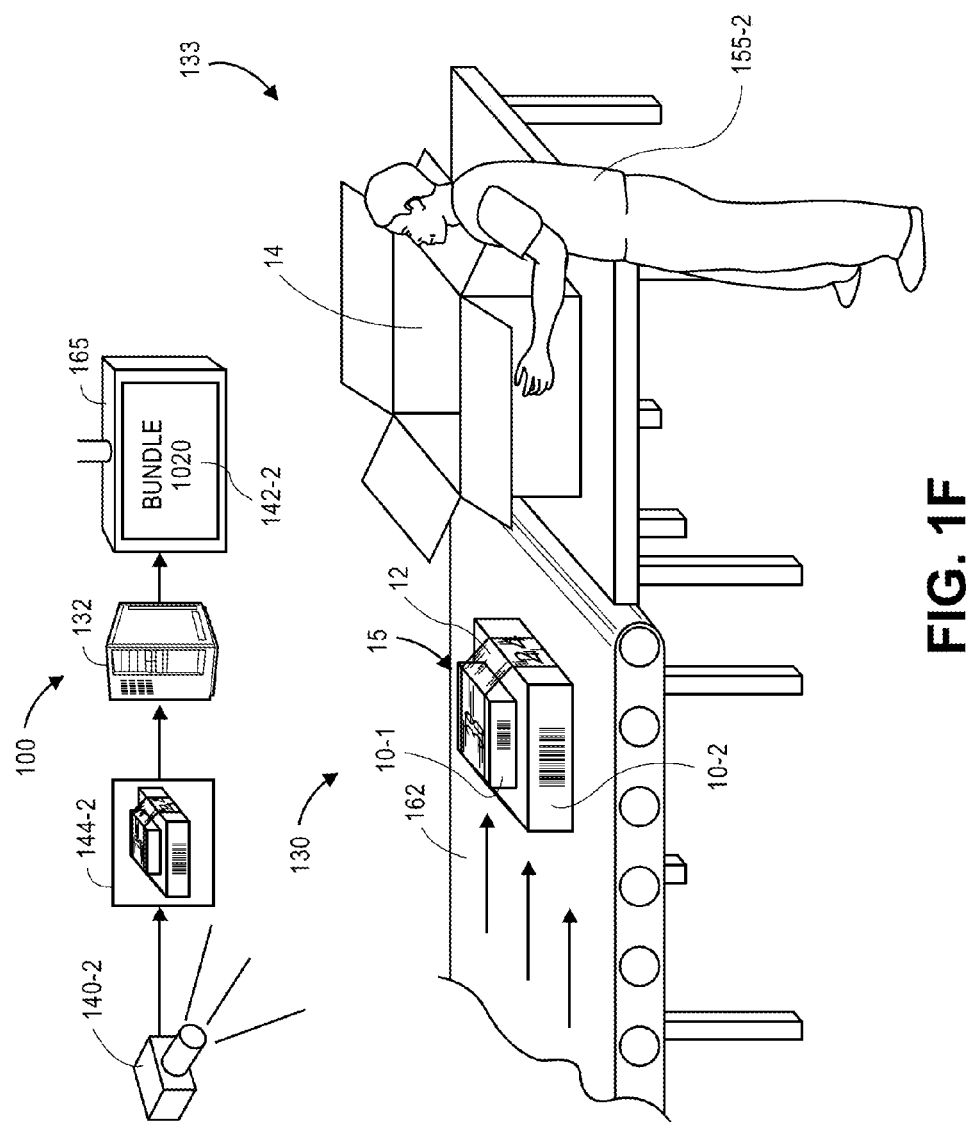

As is shown in FIG. 1F, after the image 144-2 is determined to correspond to the image 144-1 and/or the bundle 15 to a sufficiently high degree of confidence or accuracy, e.g., according to one or more image comparison or image mapping algorithms or techniques, information 142-2 corresponding to the bundle 15 may be accessed from the server 132 and utilized for any purpose. For example, as is shown in FIG. 1F, in some embodiments, at least some of the information 142-2 (such as a name of the bundle 15) may be displayed on the computer display 165 within a field of view of the worker 155-2. Alternatively, in other embodiments, one or more instructions for preparing the bundle 15 for delivery may be displayed on the computer display 165. If the image 144-2 is determined to correspond to the image 144-1 and/or the bundle 15 to a sufficiently high degree of confidence or accuracy, then no further analysis need be performed nor considerations undertaken in order to confirm that the bundle 15 represented in the image 144-1 is also represented in the image 144-2. If the image 144-2 is not determined to correspond to the image 144-1 and/or the bundle 15 to a sufficiently high degree of confidence or accuracy, however, any number of other information or data regarding the bundles or items represented in the images 144-1, 144-2 may be consulted and/or compared in order to recognize that the bundle 15 is represented within the image 144-2, and to access information regarding the bundle 15 accordingly.

Figure 1G:
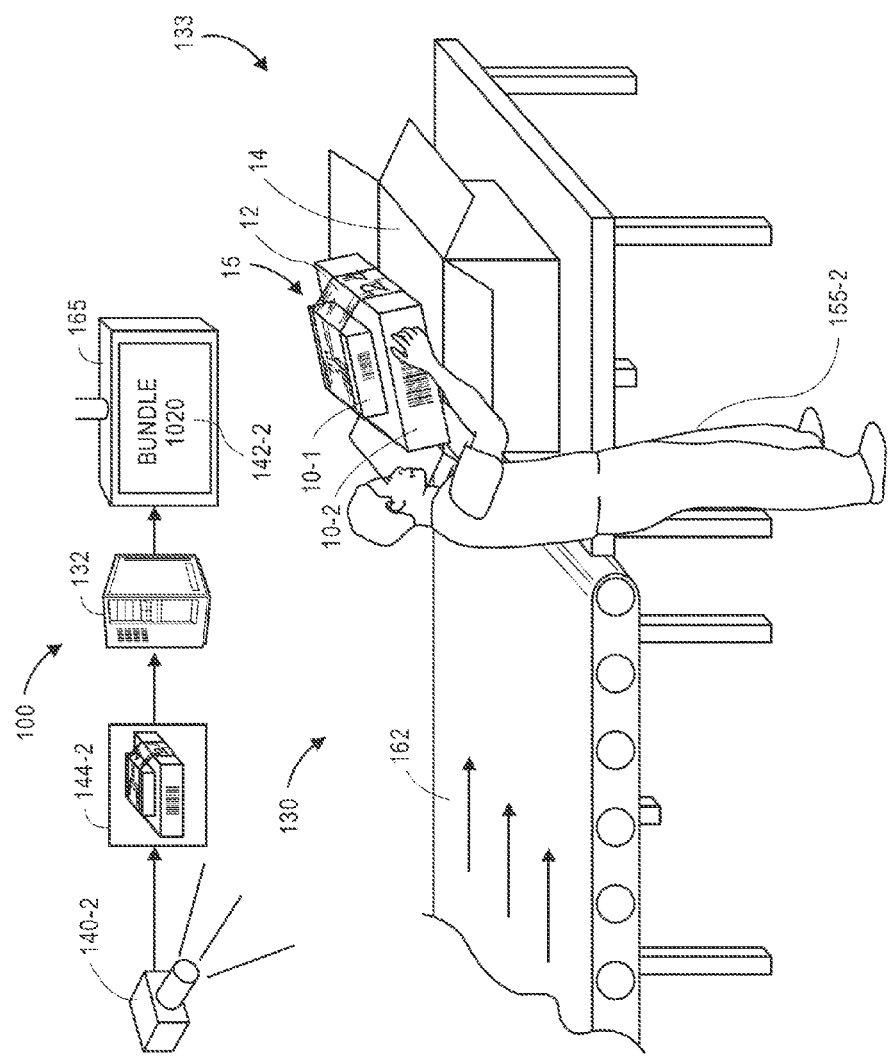
Figure 1H:
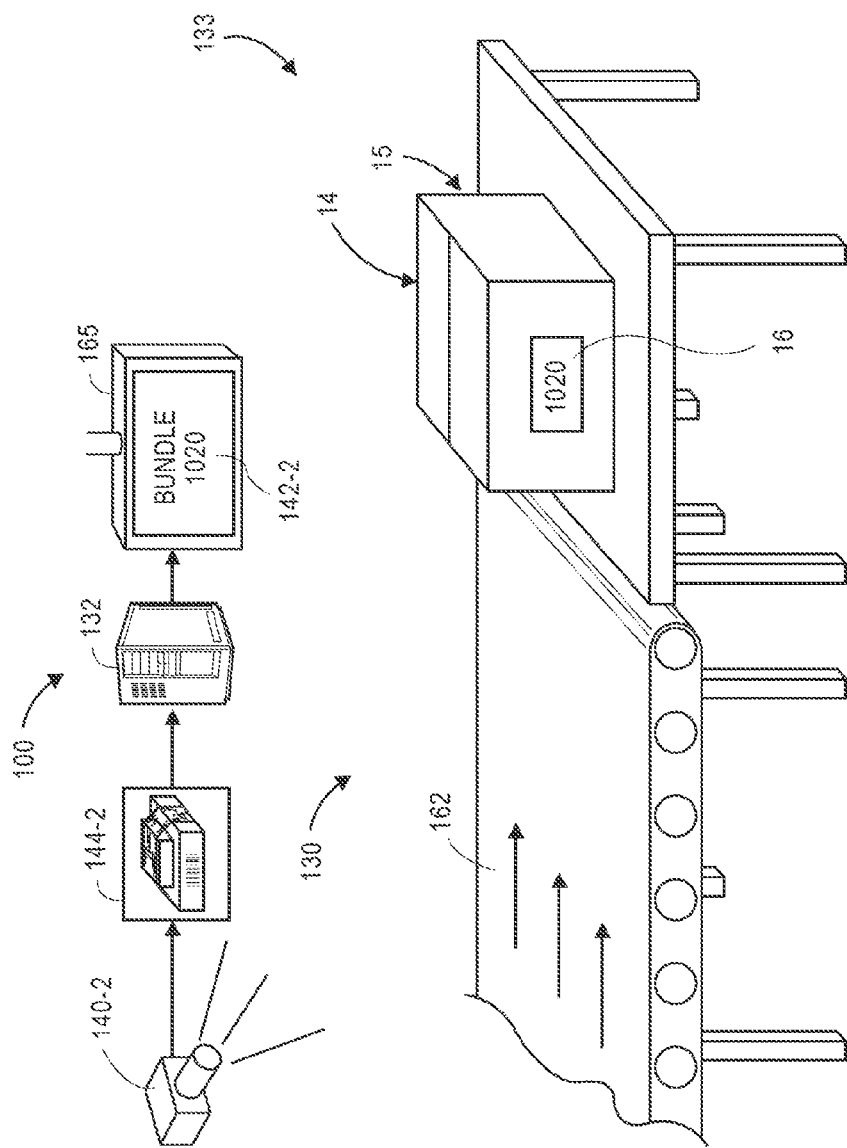

As is shown in FIG. 1G, based on the information 142-2, the worker 155-2 may identify an appropriate container 14 for the bundle 15, and place the bundle 15 therein. As is shown in FIG. 1H, a label 16 bearing a name of the bundle 15, as determined based on a comparison of the images 144-1, 144-2, may be affixed thereto. Alternatively, the label 16 may include a street address or other geolocation of a destination for the bundle 15, or any other relevant information or data regarding the bundle 15, including but not limited to information or data determined based at least in part on the comparison of the images 144-1, 144-2.

Accordingly, embodiments of the systems and methods of the present disclosure are directed to creating a unique digital identifier for a bundle (e.g., a group or a set) of one or more items that are joined by a binding agent such as one or more layers of polymer plastic film, cellophane, bubble wrap (or other plastics), paper, glues or other adhesives, or any other materials or substances that may be wrapped, enveloped or shrouded around one or more items, or used to bind two or more items together, including but not limited to shrink wrap, bubble wrap, rubber bands, adhesives, sheets of cellophane, paper or metallic or semi-metallic foils, or the like. The unique digital identifiers may be generated from imaging data, or other information or data, gathered from the individual items prior to or after combining the items into a bundle by one or more binding agents (e.g., with the bundle at a first location).

In some embodiments, a unique digital identifier for a bundle of items may be generated based on one or more images captured of the bundle, and may include two-dimensional or three-dimensional representations of the contents of such images, or portions of such images corresponding to the bundle and/or to the binding agents joining such items. In some other embodiments, a unique digital identifier may be generated based on images captured by one or more imaging devices having fields of view in any number of alignments or orientations, e.g., imaging devices aligned in the form of a tunnel or along a track over or through which any number of items may be expected to pass, and at any speed.

The unique digital identifiers that are generated in accordance with the present disclosure may be stored in association with one or more attributes of the bundle, the items or one or more orders including such items in one or more data stores, along with other identifiers of other bundles and associated attributes. Subsequently, imaging data or other information or data may be captured from the bundle (e.g., with the bundle at a second location) and processed. The processed imaging data, which may include a digital identifier generated based on such imaging data or other information or data, may be compared to a plurality of unique digital identifiers. One of the digital identifiers that most closely matches or corresponds to the processed imaging data (or a digital identifier generated therefrom) may be selected, e.g., based on a highest degree of confidence or accuracy of a match with the processed imaging data (or the digital identifier generated therefrom), and attributes of a bundle, of individual items included in the bundle, or an order with which the bundle or one or more of the individual items is associated may be accessed accordingly.

In some embodiments, a bundle may be recognized based strictly on a comparison of digital identifiers generated from imaging data, or other information or data. In some other embodiments, however, a bundle may be recognized based on a comparative process including any number of levels or stages. For example, where an image of a given bundle is captured, a digital identifier may be generated based on the image of the given bundle and compared to digital identifiers of a plurality of bundles that were previously generated based on images of such bundles. If a single one of the bundles may be identified as most closely or most likely matching the given bundle, e.g., to a sufficiently high degree of confidence or accuracy, based on a comparison of the digital identifiers, then information or data regarding the one of the bundles may be identified accordingly. If two or more of the bundles are identified as equally likely relating to the given bundle, or if two or more bundles are identified as matching the given bundle to sufficiently high degrees of confidence or accuracy, then any other information or data regarding the respective bundles may be consulted and compared in order to confirm which of the two or more bundles corresponds to the given bundle. Such other information or data may include, but is not limited to, information or data identified in or extracted from imaging data captured regarding the respective bundles, or any other information or data that may be known or obtained regarding the respective bundles.

In some embodiments, the digital identifiers of bundles of items may be generated based on imaging data captured from such bundles in different locations, e.g., by different imaging devices. In some other embodiments, the digital identifiers of bundles of items may be generated based on imaging data captured from such bundles in the same location, or by the same imaging device. For example, where a bundled set of items is formed, and the bundled set of items is to be stored on a shelf, in a locker, or in another storage area, digital identifiers for the item may be generated based on imaging data captured from the bundled set of items prior to placing the bundled set of items on the shelf, in the locker, or in the other storage area, and after the bundled set of items has been retrieved therefrom. That the retrieved bundle is the same bundle that was stored therein may be determined based on a comparison of the digital identifiers generated prior to storing the item therein, and after retrieving the item therefrom, in accordance with the present disclosure.

Online marketplaces have increased in number, prevalence and accessibility over the last several decades. Presently, customers who are interested in downloading, purchasing, renting, leasing or borrowing one or more items may access an electronic portal using one or more computer devices (e.g., personal devices such as desktop computers, laptop computers, tablet computers, smartphones or other mobile devices, as well as computers incorporated into any other appliances or machines such as automobiles, televisions, thermostats, or standalone machines such as kiosks), and search for or browse listings of items. When a customer orders two or more items from an online marketplace, such items are ordinarily delivered to the customer in a common container, along with appropriate amounts or types of dunnage.

Where multiple items are to be delivered in a common container from an origin to a destination specified by a customer, such items are frequently joined together into a bundle using one or binding agents. Such agents may include, but are not limited to, one or more layers or bands of pliable materials having sufficient strengths in tension, such as papers, plastics, rubbers, or metallic or semi-metallic materials, e.g., shrink wrap, bubble wrap, rubber bands, adhesives, sheets of cellophane, paper or metallic or semi-metallic foils, or the like. Additionally, the types of items that may be joined together for delivery are not limited. For example, items that may be joined together into a bundle include complementary items (e.g., items that may be used together or simultaneously) such as shoes and socks, paper plates and plastic forks, or containers of peanut butter and jelly, or any other items that may be efficiently linked to one another for simplicity, ease of use, or any other purpose, even if the items bear no relation to one another (e.g., shampoo and printer cartridges). In order to join two or more items into a bundle, one or more binding agents may be wrapped, shrouded or enveloped around a circumference of the bundle, or about an axis of the bundle, until the items are sufficiently bound to one another. Alternatively, one or more binding agents may be provided between two or more items, alone or in concert with one or more other binding agents, in order to bind the items to one another.

When a binding agent is wrapped around a bundle of items, at least in part, the binding agent causes the bundle to take on a unique visual appearance that is determined based on the number, type or dimensions of the items and also the binding agent used to combine the items into the bundle. For example, where three books are to be combined into a bundle using one or more lengths of a binding agent and shipped together, the visual appearance of the books and the bundle will necessarily depend on the dimensions, attributes and placement of the binding agent on the books. Naturally, a bundle of the three books that includes a wide sheet of cellophane wrapped multiple times around a circumference of the bundle will have an intrinsically different visual appearance than a bundle of the three books that includes a pair of rubber bands extending around the circumference of the bundle. Variations in the widths, lengths, thicknesses, colors, surface textures or other features of the respective binding agents will cause a bundle of items to appear differently within imaging data captured of the bundle, as the binding agents will cause the bundle to have additional facets or faces that are not present within imaging data captured when the items are merely placed in a stack.

While combining items into bundles may enhance the efficiency with which such items are transported or stored, combining or joining items into a bundle complicates efforts to identify or track the individual items in the bundle, or the bundle of items as a whole. For example, where each of the items is marked with one or more markings or identifiers on external surfaces (e.g., one or more letters, numbers, symbols or sets thereof, or bar codes, representative of a SKU, a UPC, an EAN, or another identification number or string), the act of placing such items in a stack, or joining the items with a binding agent to form a bundle, may partially or completely obscure such markings or identifiers, inherently complicating the tasks of identifying and tracking the individual items or the bundle itself, or determining a status of one or more orders with which the items or the bundle are associated.

Moreover, because a bundle may include combinations of items of any type or number, bundles are not commonly assigned standard or custom identification numbers or strings (e.g., a SKU, a UPC, an EAN, or another identification number or string) of their own, as doing so would consume such a number or string for only a brief period of time, and would typically require a label or other substrate having the number or the string, or a representation thereof, provided thereon to be affixed to one or more of the facets or faces of the bundle. While a bundle's lack of a unique identifier does not usually cause problems where the bundle is to be handled or processed in the same location where the bundle was formed, the lack of a unique identifier may be particularly problematic when the bundle is transported to another destination for handling or processing. If the contents of the bundle may not be visually identified by humans or machines at the destination, identifying the bundle may require disassembly of the bundle, in whole or in part, thereby defeating the purpose of combining the items into the bundle in the first instance.

Imaging data (e.g., visual imaging data) may be captured using one or more imaging devices such as digital cameras. Such devices may generally operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light, or a distance corresponding to such pixels. Such sensors may generate data files including such information, e.g., digital images, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet.

A digital image is a collection of pixels, typically arranged in an array, which defines an optically formed reproduction of one or more objects, backgrounds or other features of a scene and may be stored in a data file. In a visual image, each of the pixels represents or identifies a color or other aspect associated with a unique portion of such objects, backgrounds or features. For example, a black-and-white image includes a single bit for representing a light condition of the pixel in a binary fashion (e.g., either black or white), while a grayscale image may represent the light condition in multiple bits (e.g., two to eight bits for defining tones of gray in terms of percentages or shares of black-and-white), and a color image may include groups of bits corresponding to each of a plurality of base colors (e.g., red, green or blue), and the groups of bits may collectively represent a color associated with the pixel. A depth image, or a depth map, is a digital image that defines an optically formed reproduction of one or more objects, backgrounds or other features of a scene, and may also be stored in a data file. Unlike the pixels of a visual image, however, each of the pixels of a depth image represents or identifies not a light condition or color of such objects, backgrounds or features, but a distance to a portion of an object, a backgrounds or a feature. For example, a pixel of a depth image may represent a distance between a sensor of an imaging device that captured the depth image (e.g., a depth camera or range sensor) and the respective object, background or feature to which the pixel corresponds.

Imaging data files that are stored in one or more data stores may be printed onto paper, presented on one or more computer displays, or subjected to one or more analyses, such as to identify items expressed therein. Such data files may be stored in any number of formats, including but not limited to JPEG or JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some modern imaging devices may digitally or electronically adjust a digital image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a visual image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #31314A. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The systems and methods of the present disclosure are directed to generating unique digital identifiers for identifying and tracking bundles of units, e.g., one or more commercial goods or other items, and recognizing bundles of units based on such identifiers. The unique digital identifiers of the present disclosure may be generated after the units have been combined into a bundle using one or more binding agents, based on imaging data (e.g., still or moving two-dimensional or three-dimensional images) captured from the bundle, or any other available information or data regarding the bundle. Where binding agents that form a bundle are represented within imaging data representing the bundle, the imaging data may uniquely identify the bundle based at least in part on variations in widths, lengths, thicknesses, colors, surface textures or other features of the binding agents expressed within the imaging data. For example, visual imaging data captured from a bundle (e.g., one or more RGB images of the bundle) will appear differently based on the type and number of binding agents that are used to form the bundle, and the placement of such binding agents on the items from which the bundle was formed. Likewise, depth imaging data (e.g., a depth model or point cloud) captured from the bundle may represent distances to portions of the bundle differently based on the sizes, shapes or surface features of the binding agents.

The unique digital identifiers of the present disclosure may take any form. For example, the identifiers may be multi-character strings representative of imaging data or other information or data captured from the bundle after the items have been joined by a binding agent, including but not limited to labels or descriptors of the binding agent, an orientation or alignment of the binding agent around the items, or a shape of the items or the binding agent. The identifiers may further include digital images, e.g., two-dimensional visual images or three-dimensional point clouds, corresponding to the bundles or portions thereof. In some embodiments, an identifier may be a visual image (e.g., an RGB color image) of a bundle, or a depth image (or point cloud) of the bundle.

In some embodiments, an identifier may be a visual image or a depth image (or point cloud) of a binding agent used to combine a plurality of items into a bundle. Such an identifier of a first bundle may be formed by capturing a first image of a stack or other arrangement of items prior to their combination into the first bundle, then capturing a second image of the stack or arrangement has been combined into the first bundle, e.g., by wrapping the stack or arrangement using a binding agent. Next, the contents of the first image may be digitally subtracted from the contents of the second image, in order to identify imaging data that corresponds exclusively to the binding agent, which may represent the identifier of the first bundle.

Where a unique digital identifier of a given bundle includes or comprises a digital image, the unique digital identifier may be compared to digital images of a plurality of bundles, in order to determine which of the bundles corresponds to the given bundle. The identifiers and/or digital images may be compared to one another by any algorithm or technique for image mapping or image comparison, including but not limited to Mean Squared Error (MSE) or the Structural Similarity Index (SSIM), or algorithms or techniques operating one or more Hidden Markov Models.

The binding agents of the present disclosure may include or comprise any given materials, including but not limited to papers, plastics, rubbers, metals or semi-metals. The binding agents may take any color, shape or form and have any dimension. Moreover, one or more surfaces of the binding agents may be modified or altered, as necessary, in order to enhance the visibility of such agents within imaging data. For example, the binding agents may be stamped, printed, painted, embossed or otherwise marked with one or more markings, which may be regular or irregular in nature. Additionally, the binding agents may be etched, scuffed or otherwise marked with texture features or surface irregularities that would enhance the ability of such binding agents to be recognized within visual imaging data and/or depth imaging data. The binding agents may be further embedded or infused with one or more magnetic or metallic particles or other materials that may enhance the ability of the binding agents to be recognized by magnetic sensors, in addition to imaging devices or other sensors.

The generation and use of unique digital identifiers of bundles of items in accordance with the present disclosure thus provides an efficient manner for identifying such bundles from a distance, by one or more machines, particularly in instances in which the bundles themselves lack identification numbers or strings of their own, and where the bundles of items are to be transported to locations or destinations that are remote from a location or origin at which the items were combined into the bundles, or where the identity or other attributes of items included in the bundle must be determined well after the items were combined into the bundles. Digital identifiers of bundles may be stored in association with any relevant information regarding the bundles, one or more items included in such bundles, or an order with which a bundle or items included therein are associated.

Once a bundle has been identified based on a comparison between an image of the bundle, and imaging data or other representations of a unique digital identifier of the bundle, e.g., to a highest degree of confidence or accuracy, the bundle may be processed or otherwise handled in any manner. For example, information or data regarding the bundle (e.g., instructions for processing or handling the bundle) may be shown on one or more displays. Additionally, a container may be selected for the bundle based on the information or data (e.g., dimensions of the bundle, or a destination for the bundle). Rather than requiring workers to identify the bundle by other means, e.g., by manually disassembling the bundle and evaluating each of the individual items therein, the systems and methods of the present disclosure permit such workers to immediately begin processing or handling the bundle and the items therein, such as by depositing the bundle into a container or a specific storage area, or otherwise handing the bundle in any other manner. Bundles may be recognized based on a comparison of digital identifiers, where a matching pair of digital identifiers may be identified with a sufficiently high degree of confidence or accuracy. Alternatively, where a pair of digital identifiers may not be identified as matching to such a degree of confidence or accuracy, or where multiple pairs of digital identifiers are so identified, a given pair of digital identifiers may be selected based on any additional information or data that may be available regarding the digital identifiers or the bundles, including but not limited to information or data that may be identified based on portions of imaging data not including or corresponding to a binding agent, or any other information or data.

Figure 2:
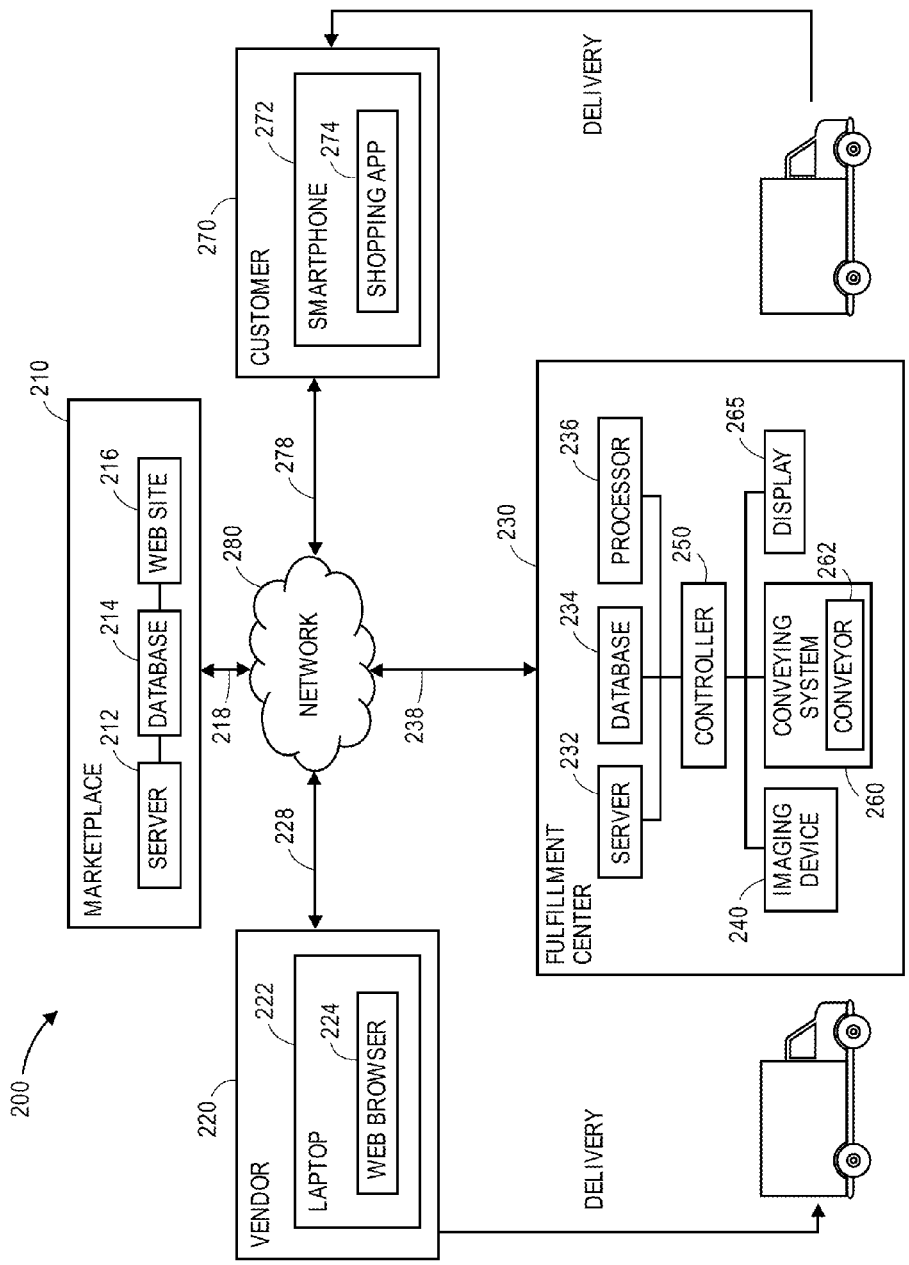
FIG. 2 is a block diagram of components of one system for bundled unit identification or tracking in accordance with embodiments of the present disclosure.

Referring to FIG. 2, a block diagram of components of one system 200 for bundled unit identification or tracking in accordance with embodiments of the present disclosure is shown. The system 200 includes a marketplace 210, a vendor 220, a fulfillment center 230 and a customer 270 that are connected to one another across a network 280, such as the Internet. Except where otherwise noted, reference numerals preceded by the number "2" shown in FIG. 2 indicate components or features that are similar to components or features having reference numerals preceded by the number "1" shown in FIGS. 1A through 1H.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and databases (or other data stores) 214 for hosting a web site 216. The marketplace 210 may be physically or virtually associated with one or more storage or distribution facilities, including but not limited to the fulfillment center 230. The web site 216 may be implemented using the one or more servers 212, which connect or otherwise communicate with the one or more databases 214 as well as the network 280, as indicated by line 218, through the sending and receiving of digital data. The servers 212 may cause the display of information associated with the web site 216 in any manner, e.g., by transmitting code such as Hypertext Markup Language (HTML), over the network 280 to another computing device that may be configured to generate and render the information into one or more pages or to cause a display of such pages on a computer display of any kind. Moreover, the database 214 may include any type of information regarding items that have been made available for sale through the marketplace 210, or ordered by customers (e.g., the customer 270) from the marketplace 210. The servers 212 may further execute any type of computer-based function or compute any type or form of calculation, including but not limited to any formulas, equations, algorithms or techniques for determining one or more probabilities or performing any number of statistical tests.

The vendor 220 may be any entity or individual that intends to make one or more items available to customers, such as the customer 270, by way of the marketplace 210. The vendor 220 may operate one or more order processing and/or communication systems using a computing device such as a laptop computer 222 (as well as a tablet computer, a smartphone, a desktop computer or any other type or form of computing device) and/or software applications such as a browser 224, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230, or to the customer 270 or other destinations (not shown). Additionally, the vendor 220 may receive one or more items from manufacturers, merchants, sellers or other vendors (not shown), and may deliver one or more of such items to locations designated by the marketplace 210, such as the fulfillment center 230, for fulfillment and distribution to customers, or to the customer 270 directly. Furthermore, the vendor 220 may perform multiple functions. For example, the vendor 220 may also be a manufacturer, a merchant or a seller of one or more other items, and may also offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be, or may be operated by, a manufacturer, a merchant, a seller or a vendor.

The fulfillment center 230 may be any facility that is adapted to receive, store, process and/or distribute items on behalf of the marketplace 210. As is shown in FIG. 2, the fulfillment center 230 includes a networked computer infrastructure for performing various computer-related functions associated with the receipt, storage, processing and distribution of such items, including one or more physical computer servers 232, databases (or other data stores) 234 and processors 236, that may be provided in the same physical location as the fulfillment center 210, or in one or more alternate or virtual locations, e.g., in a "cloud"-based environment. The fulfillment center 230 may also include stations for receiving, storing and distributing items to customers, such as one or more receiving stations, storage areas and distribution stations. The fulfillment center 230 further includes an imaging device 240, a controller 250, a conveying system 260 having at least one conveyor 262 and a computer display 265.

The imaging device 240 may be any form of optical recording device that may be used to photograph or otherwise record imaging data of structures, facilities or any other elements within the fulfillment center 230, as well as any items within the fulfillment center 230, or for any other purpose. The imaging device 240 may include one or more sensors, memory or storage components and processors, and such sensors, memory components or processors may further include one or more photosensitive surfaces, filters, chips, electrodes, clocks, boards, timers or any other relevant features (not shown). The imaging device 240 may capture imaging data in the form of one or more still or moving images of any kind or form, as well as any relevant audio signals or other information, within one or more designated locations within the fulfillment center 230.

The imaging device 240 may be connected to the controller 250, the conveying system 260 and/or the display 265 by way of a wired or wireless connection that may be dedicated or comprise all or part of an internal network (not shown). Additionally, the imaging devices 240 may be adapted or otherwise configured to communicate with one another, or with the marketplace 210 or the marketplace server 212, the vendor 220 or the vendor laptop computer 222 or the customer 270 or customer smartphone 272, or to access one or more other computer devices (not shown) by way of the network 280. Although the fulfillment center 230 of FIG. 2 includes a single box corresponding to one imaging device 240, those of ordinary skill in the pertinent arts will recognize that any number or type of imaging devices may be provided in accordance with the present disclosure, including but not limited to digital cameras, depth sensors or range cameras, infrared cameras, radiographic cameras or other optical sensors.

In addition to imaging device 240, the fulfillment center 230 may also include any number of other sensors, components or other features for controlling or aiding in the operation of the imaging device 240 and/or the conveying system 260, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

The controller 250 may be any type or form of electronic device or system configured to control the operation of the conveying system 260, the imaging device 240, or any other aspect of operations within the fulfillment center 230. The controller 250 may be in communication with one or more workers within the fulfillment center 230, or the various facilities and other components of the fulfillment center 230. The controller 250 may also be associated with one or more other computing devices or machines, and may communicate with the marketplace 210, the vendor 220 or the customer 270 over the network 280, as indicated by line 238, through the sending and receiving of digital data.

The controller 250 may generate instructions or commands based on information received from the imaging device 240 or the conveying system 260, or information received from the server 212, the server 232, or any other external computing device via the network 280. For example, the controller 250 may transmit one or more control signals to motors associated with one or more aspects of the conveying system 260, including but not limited to the conveyor 262, as well as any divert mechanisms (not shown) or connections to other systems. Thus, in response to such control signals, an item may be placed onto the conveyor 262 or another element of the conveying system and transported to a predetermined destination, where the item may be removed from the conveyor 262 or another element of the conveying system 260, e.g., by one or more divert mechanisms, as necessary. The controller 250 may be associated with any form of motors, power sources or other components for operating the various machines or apparatuses within the fulfillment center 230, including but not limited to the imaging device 240 or various aspects of the conveying system 260.

The conveying system 260 may comprise one or more powered or powerless conveyors 262 that are provided for transporting objects, items or materials of varying sizes and shapes, and include any number of machines or elements for causing the motion or translation of such objects, items or materials from one location to another. The conveyor 262 may include any form of mover, including but not limited to belts, chains, screws, tracks or rollers, that may drive such machines or elements, as well as any number of containers or carriers for transporting such objects on or within the mover itself. Such machines or elements may further include one or more pulleys, shafts, hubs, bushings, sprockets, bearings and other elements for causing a movement of the conveyor 262. Further, the conveyor 262 and/or the conveying system 260 may convey objects, items or materials into one or more static or dynamic conveying apparatuses, which may include one or more machines or elements such as a bin, a chute, a cart, a truck or another like apparatus. Although the fulfillment center 230 of FIG. 2 includes a single box corresponding to one conveying system 260, and this box includes a single box corresponding to one conveyor 262, those of ordinary skill in the pertinent arts will recognize that any number or type of conveying systems or conveyors may be provided in accordance with the present disclosure.

The fulfillment center 230 also includes one or more workers (not shown), who may be any designated personnel tasked with performing one or more tasks within the fulfillment center 230. Such workers may handle or transport items (e.g., any type or form of good, product, media or other tangible consumer article) within the fulfillment center 230, or operate one or more pieces of equipment therein (not shown). The workers may also operate one or more specific computing devices or machines for registering the receipt, retrieval, transportation or storage of items within the fulfillment center 230, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

The fulfillment center 230 may operate one or more order processing and/or communication systems using computer devices in communication with one or more of the server 232, the database 234 and/or the processor 236, or through one or more other computing devices or machines that may be connected to the network 280, as is indicated by line 238, in order to transmit or receive information in the form of digital or analog data, or for any other purpose. In some embodiments, the server 232, the database 234 and/or the processor 236 or any number of other computing devices or machines may further execute any type of computer-based function or compute any type or form of calculation, including but not limited to any formulas, equations, algorithms or techniques for determining one or more probabilities or performing any number of statistical tests.

Such computer devices or machines may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 230 may also include one or more predefined two-dimensional or three-dimensional storage areas including facilities, for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones). Alternatively, an item received at a receiving station of the fulfillment center 230 may be transferred directly to a distribution station for further processing, or "cross-docked," without first being placed into storage in an intermediate storage area.

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or more items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "worker," or a "customer," or like terms, may be automated steps performed by their respective computer systems, or implemented within software modules (or computer programs) executed by one or more general purpose computers. Moreover, those of ordinary skill in the pertinent arts would recognize that references to process steps or actions described herein as being performed by or relating to a "vendor" could also be performed by or relate to a manufacturer, a merchant or a seller, or another source of items. Those of ordinary skill in the pertinent arts would also recognize that process steps described as being performed by a "marketplace," a "vendor," a "fulfillment center," a "worker," or a "customer" may be typically performed by a human operator, but could, alternatively, be performed by an automated agent.

The marketplace 210, the vendor 220, the fulfillment center 230 and/or the customer 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the server 212, the laptop computer 222, a desktop computer, the smartphone 272 or any other computer device in real time or in near-real time, or in one or more offline processes, via the network 280. Those of ordinary skill in the pertinent art would recognize that the marketplace 210, the vendor 220, the fulfillment center 230 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232, or the smartphone 272, or any other computers or control systems utilized by the marketplace 210, the vendor 220, the fulfillment center 230 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference the capture of imaging data regarding bundles of items that are combined and bound by binding agents at a fulfillment center or like facility associated with an online marketplace, and the generation and use of unique digital identifiers for such bundles or such items within the fulfillment center or like facility, those of ordinary skill in the pertinent arts will recognize that the systems and methods disclosed herein are not so limited. Rather, the generation and use of unique digital identifiers in accordance with the present disclosure may be utilized in any relevant application, including but not limited to the generation and use of identifiers for objects having any type or form of covering or joining means, including environments in which imaging devices are fixed in position, e.g., in a fulfillment center, and also environments in which the imaging devices are in motion, e.g., aboard one or more vehicles configured for operation in the air, on land and sea. Moreover, some of the embodiments of the present disclosure may be utilized in connection with the identification of single items, e.g., bundles consisting of a single unit or item, that are wrapped, enveloped or shrouded in binding agents. Unique digital identifiers for bundles of single items may be generated and used in the same manner, or in similar manners, as unique digital identifiers that are generated and used for bundles of multiple items in accordance with the present disclosure.

As is discussed above, some embodiments of the present disclosure are directed to generating unique digital identifiers for bundled units, e.g., bundles of items, based on imaging data and/or information or data gathered at a first location, and using one of the unique digital identifiers to recognize a bundle among a plurality of bundles or other objects, e.g., by capturing and processing imaging data and/or other information or data captured from the bundle and comparing the processed imaging data and/or other information or data to any of a plurality of unique digital identifiers. Where the processed imaging data and/or other information or data is determined to be associated with one of the unique digital identifiers, e.g., by generating a unique digital identifier for a given bundle from information or data captured from the bundle and identifying one of the unique digital identifiers that matches the digital identifier generated for the given bundle to a sufficiently high degree of confidence or accuracy, attributes that are associated with the bundle, the individual items included in the bundle, or an order with which the bundle or any of the individual items is associated may be automatically accessed and utilized for any purpose without having to manually evaluate the bundle or the individual items included therein.

Figure 3:
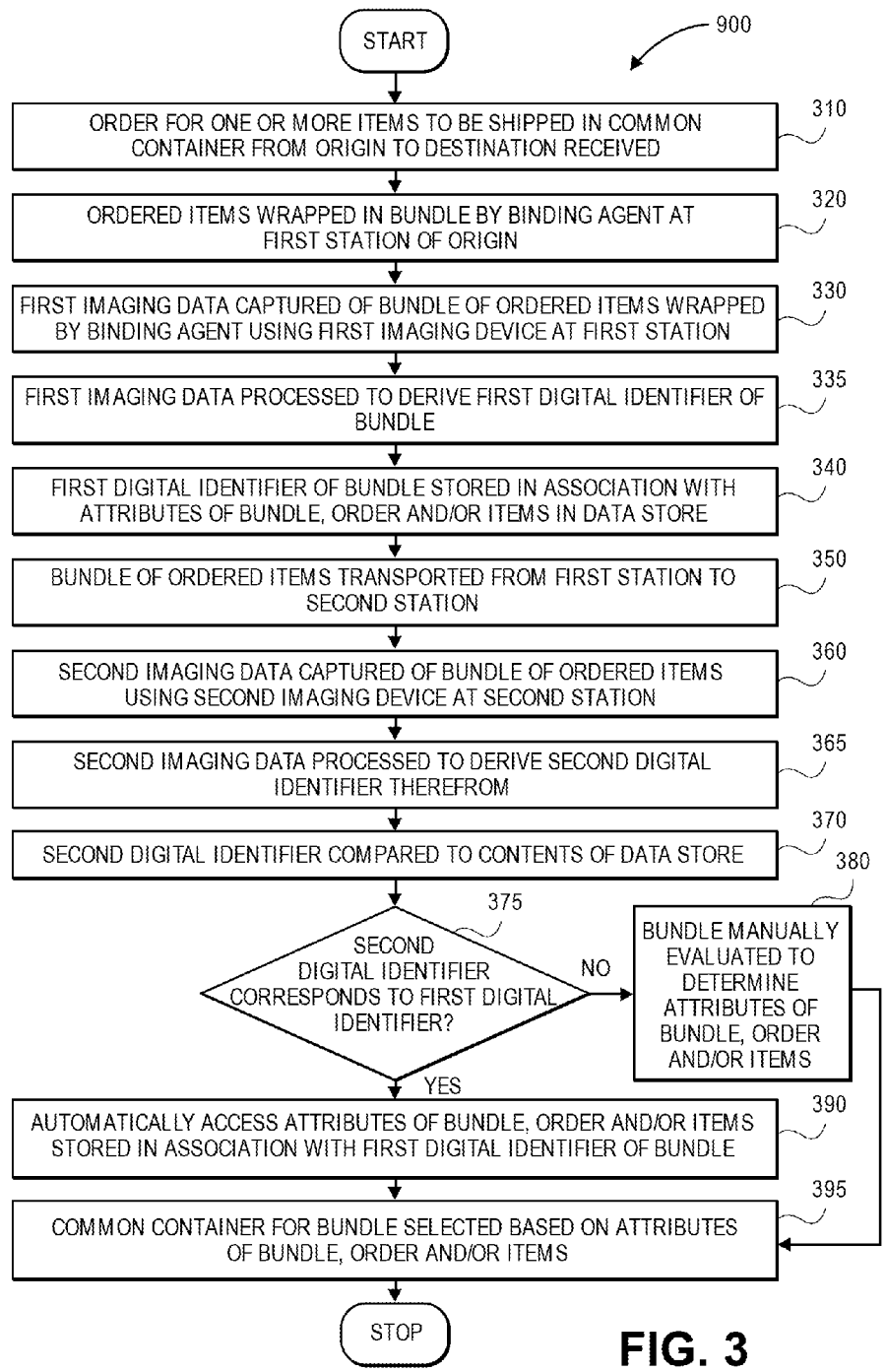
FIG. 3 is a flow chart of one process for bundled unit identification or tracking in accordance with embodiments of the present disclosure.

Referring to FIG. 3, a flow chart 300 representing one process for bundled unit identification or tracking in accordance with embodiments of the present disclosure is shown. At box 310, an order for one or more items to be shipped in a common container from an origin to a destination is received. For example, the order may be placed by a customer using a personal computer device (e.g., a desktop, a laptop, a mobile device or any other computer device) configured to access a network site (e.g., a web site) or shopping application associated with an online marketplace, and the customer may specify the destination to which the items are to be delivered (e.g., a home address, a business address, or any other address). The order may be placed for a plurality of items (e.g., two or more items) or, alternatively, for a single item.

At box 320, the ordered items may be wrapped in a bundle by a binding agent at a first station at the origin. For example, the items may be retrieved from one or more respective storage areas or locations within a fulfillment center, and transported (e.g., by humans, autonomous mobile robots, unmanned aerial vehicles) to a preparation station, where a human or machine may wrap, combine, bind, envelop or shroud the items, e.g., around a circumference of the bundle, or about an axis of the bundle, until the items are sufficiently bound to one another, using a binding agent such as shrink wrap, bubble wrap, rubber bands, sheets of cellophane, paper or metallic or semi-metallic foils, or the like. Alternatively, where the order includes a single item, the single item may be wrapped, enveloped or shrouded using a binding agent. At box 330, first imaging data is captured from the bundle of the ordered items that are wrapped by the binding agent using a first imaging device at the first station. For example, referring again to FIG. 1C, the imaging device 140-1 may capture a digital image (e.g., the image 144-1) of the bundle 15 including the items 10-1, 10-2 that are wrapped or otherwise joined by the length 12 of the binding agent 125. The digital image may be a visual image (e.g., an RGB color image, a grayscale image, a black and white image), a depth image, or any other type or form of imaging data (e.g., a set of imaging data that includes both visual imaging data and depth imaging data). In some embodiments, the first imaging data may be captured by a plurality of imaging devices at the first station, and each of the imaging devices may be uniquely aligned or uniquely configured to capture the first imaging data from a unique perspective or in a different manner. For example, the first imaging data may be captured using a plurality of imaging devices aligned in a tunnel-like configuration, with the bundle of the ordered items stationary or in motion, e.g., traveling past or through the imaging devices from another location to the first station, or from the first station to another location.

At box 335, the first imaging data is processed in order to derive a first digital identifier of the bundle therefrom. For example, where the first imaging data is RGB color imaging data, the first imaging data may be processed according to one or more algorithms or tools in order to recognize and mark transitions (e.g., the edges, contours, outlines, colors, textures, silhouettes, shapes or other characteristics of objects or portions thereof) within the first imaging data as closely as possible, in order to recognize objects or portions of objects, including one or more portions of the binding agent, and optionally one or more of the individual items of the bundle. The objects or portions of such objects may be identified according to one or more detection algorithms or techniques, including but not limited to one or more Canny edge detectors or algorithms, or one or more Sobel operators, algorithms or filters.

Any system or method for detecting objects or portions of objects within an image may be used to identify binding agents and/or items of a bundle within imaging data in accordance with the present disclosure. A digital identifier of a bundle may include or comprise alphanumeric identifiers or strings representative of imaging data (e.g., visual imaging data or depth imaging data) captured from the bundle, or alphanumeric identifiers or strings representative of portions of the imaging data corresponding to a binding agent and/or items, or such portions of the imaging data itself. In some embodiments, a digital identifier may be a color image of a bundle, including one or more binding agents. In some other embodiments, a digital identifier may be a depth image or point cloud of a bundle, including the one or more binding agents. In addition to information or data regarding the binding agent, any other information or data regarding the bundle or the individual items the items may be determined from the processing of the first imaging data, as well.

At box 340, the first digital identifier of the bundle is stored in association with attributes of the bundle, the order or the items in a data store. Such attributes may include identifiers of the order or each of the individual items, as well as an intended destination for the bundle (e.g., one or more stations within the fulfillment center or other facility, or an address or other location specified by the customer). Such attributes may also include dimensions of the bundle or the individual items therein (e.g., heights, widths, lengths, masses, volumes), identifiers of contents or ingredients of the individual items, handling or routing instructions for the bundle or the individual items, or any other relevant facts regarding the bundle or the individual items. Such attributes may further include identifiers of the customer or the order, a payment instrument used by the customer to place the purchase, or any other relevant facts regarding the customer or the order. The first digital identifier and the attributes of the bundle, the order or the items may be stored in one or more folders, files or records along with first digital identifiers and attributes of other bundles, of other orders associated with such other bundles, or of other items included in such other bundles. The first digital identifier and the attributes of the bundle, the order or the items may also be stored in association with any other information or data. For example, the first digital identifier and the attributes may be stored in association with all or portions of the first imaging data, regardless of whether such portions were used in the generation of the first digital identifier at box 335.

At box 350, the bundle of the ordered items is transported from the first station to a second station. For example, referring again to FIGS. 1E and 1F, the worker 155-1 may place the bundle 15 on the conveyor 162 at the preparation station 131, and the bundle 15 may be transported to the packing station 133 on the conveyor 162. Alternatively, the bundle may be delivered from the first station to the second station by a human, an autonomous robot, or any other means. At box 360, second imaging data is captured of the bundle of the ordered items using a second imaging device at the second station. For example, referring again to FIG. 1F, the imaging device 140-2 may capture a digital image (e.g., the image 144-2) of the bundle 15, the items 10-1, 10-2 and the length 12 of the binding agent 125. The digital image may be a visual image, a depth image, or any other type or form of imaging data. In some embodiments, the second imaging data, like the first imaging data, may be captured by a plurality of imaging devices at the second station, and each of the imaging devices may be uniquely aligned or uniquely configured to capture the second imaging data from a unique perspective or in a different manner. For example, the second imaging data may be captured using a plurality of imaging devices aligned in a tunnel-like configuration, with the bundle of the ordered items stationary or in motion, e.g., traveling past or through the imaging devices from another location to the second station, or from the second station to another location.

At box 365, the second imaging data is processed in order to derive a second digital identifier therefrom. For example, the second imaging data may be processed in the same manner that the first imaging data was processed at box 335, e.g., in order to generate the second digital identifier from the second imaging data in the same manner that the first digital identifier was generated from the first imaging data. At box 370, the second digital identifier is compared to the contents of the data store, including any number of other digital identifiers of bundles stored in association with attributes of such bundles. The second digital identifiers and/or second imaging data may be compared to the contents of the data store using any type or form of image comparison (or image mapping) algorithm or technique.

At box 375, whether the second digital identifier corresponds to the first digital identifier of the bundle derived from the first imaging data at box 335 is determined. For example, where a plurality of bundles of ordered items are transported from the first station to the second station at box 350, imaging data (e.g., visual imaging data and/or depth imaging data) may be captured from at least some of the plurality of bundles of ordered items at box 360, and such imaging data may be processed in order to identify digital identifiers for at least some of the bundles of ordered items at box 365. Each of the digital identifiers may be compared to the contents of the data store at box 370, and a digital identifier identified as matching one of the digital identifiers stored in the data store to a highest degree of confidence or accuracy, e.g., the first digital identifier of the bundle derived from the first imaging data at box 335, may be determined.

If the second digital identifier does not match the first digital identifier of the bundle derived from the first imaging data to a sufficiently high degree of confidence or accuracy, then the process advances to box 380, where the bundle is manually evaluated to determine the one or more attributes of the bundle, the order or the individual items, and to box 395, where a common container for the bundle is selected based on such attributes, and the process ends. For example, if the bundle is not recognized based on a comparison of the second digital identifier derived from the second imaging data captured at the second station to the first digital identifier derived from the first imaging data captured at the first station, the bundle and the items may be diverted from a conveyor, a working surface or another apparatus at the second station to another intervening location, where the bundle may be subject to human or machine-based inspections. Based at least in part on such inspections, any desired attributes (e.g., dimensions, destinations, or the like) of the bundle, the order or the items may be determined, and such attributes may be used to select a common container for the bundle. Alternatively, prior to performing such an evaluation or inspection, any type or form of information or data regarding two or more bundles may be considered and/or compared in order to increase a degree of confidence or accuracy of a match between two digital identifiers of bundles, or to resolve an impasse created where two or more digital identifiers have equally or sufficiently high probabilities of a match with a digital identifier of a given bundle.

If the second digital identifier corresponds to the first digital identifier of the bundle derived from the first imaging data, then the process advances to box 390, where the attributes of the bundle, the order and/or the items stored in association with the first digital identifier are automatically accessed from the data store, and then to box 395, where a common container for the bundle is derived based on such attributes, and the process ends. Any related actions or functions may be executed upon determining that the second digital identifier derived from the second imaging data corresponds to the first digital identifier derived from the first imaging data, or does not correspond to the first digital identifier derived from the first imaging data. For example, one or more instructions for preparing or processing the bundle for delivery may be displayed on one or more computer displays, e.g., the computer display 165 shown in FIG. 1G. Alternatively, an appropriate container for delivering the bundle to a destination may be automatically prepared from stock materials.

Accordingly, based on comparisons of imaging data or other information or data captured from a bundle of items in different locations, or comparisons of digital identifiers generated based on the imaging data or other information or data captured from the bundle at such different locations, attributes of the bundle, the items included in the bundle, or an order associated with the bundle of the items may be automatically determined for any purpose. Although the process shown in the flow chart 300 of FIG. 3 contemplates utilizing such attributes to identify an appropriate common container for the bundle, the systems and methods of the present disclosure are not so limited, and may be utilized in connection with any application in which a faster and more efficient identification of bundles of items is desired or required. In some embodiments, digital identifiers may be generated based on information or data captured using different imaging devices in different locations (e.g., at the first working station 131 or the second working station 133 of FIGS. 1A through 1H). In some other embodiments, digital identifiers may be generated based on information or data captured using imaging devices or other sensors at the same location but at different times, such as where a bundle of items is wrapped, enveloped or shrouded in a binding agent at a first time and placed into storage, and retrieved therefrom at a second time.

Figure 4A:
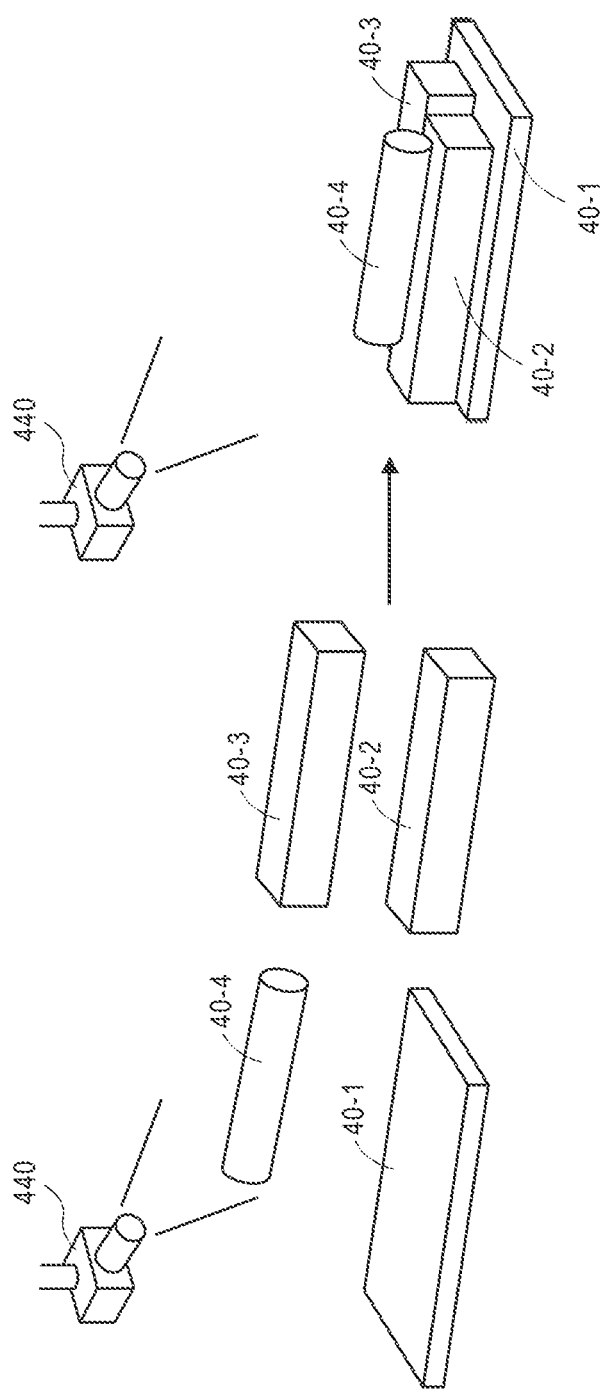
FIGS. 4A and 4B are views of aspects of a system for bundled unit identification or tracking in accordance with embodiments of the present disclosure.
Figure 4B:
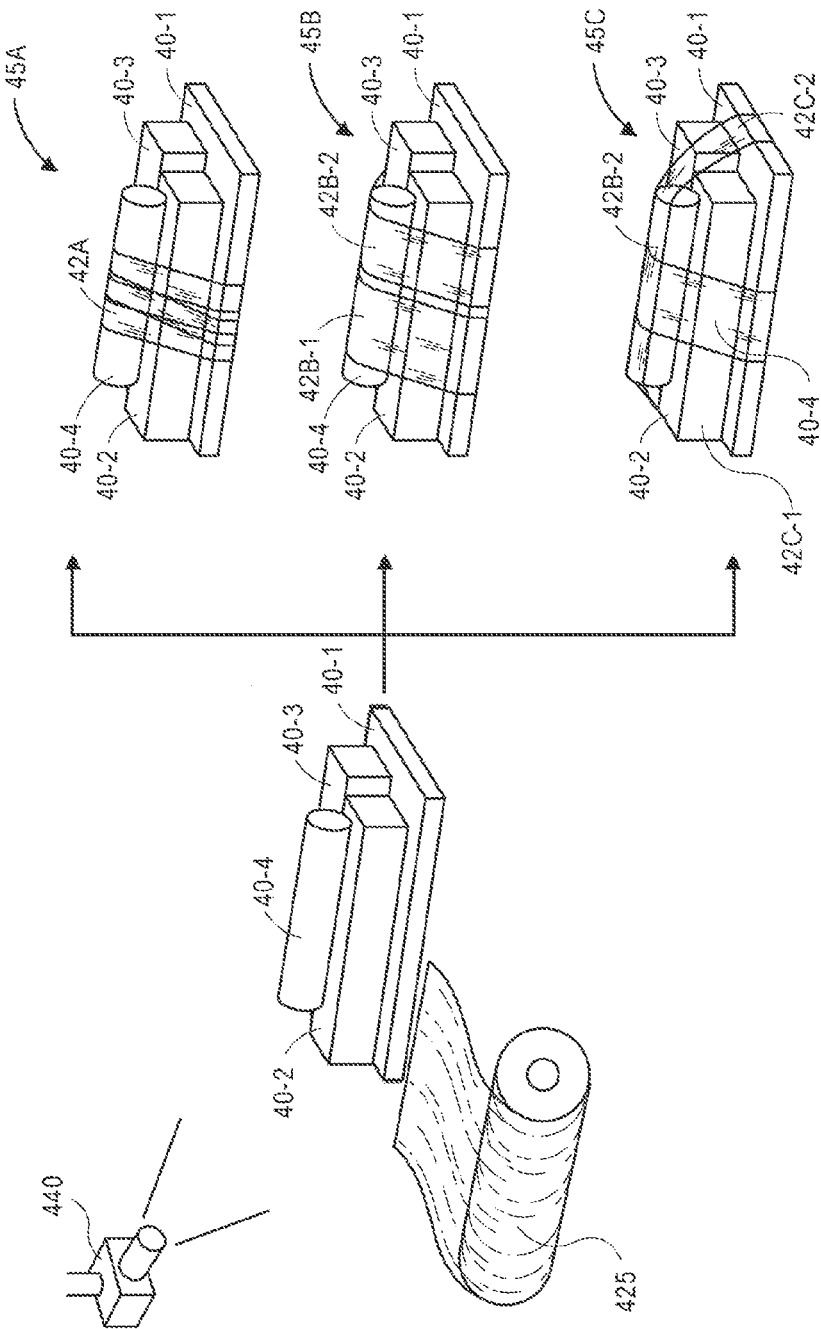

The digital identifiers of the present disclosure may be generated by capturing information or data (e.g., imaging data) from a bundle of one or more items after the items have been wrapped, enveloped or shrouded by a binding agent, e.g., around a circumference of the bundle, or about an axis of the bundle. Because a binding agent may be positioned on, around or between items in any manner and in any location, each bundle of items will appear differently within one or more images or other imaging data. Referring to FIGS. 4A and 4B, views of aspects of a system for bundled unit identification or tracking in accordance with embodiments of the present disclosure are shown. Except where otherwise noted, reference numerals preceded by the number "4" shown in FIG. 4A or FIG. 4B indicate components or features that are similar to components or features having reference numerals preceded by the number "2" shown in FIG. 2, or by the number "1" shown in FIGS. 1A through 1H.

As is shown in FIG. 4A, a plurality of items 40-1, 40-2, 40-3, 40-4 may be stacked or otherwise positioned adjacent to one another, within a field of view of an imaging device 440, or any number of other imaging devices (not shown). The items 40-1, 40-2, 40-3, 40-4 may be aligned in any manner, such as by placing a largest item, or an item having a substantially large and flat surface, viz., the item 40-1, onto a working surface and placing one or more additional items, viz., the items 40-2, 40-3, 40-4, atop that item, as is shown in FIG. 4A.

As is shown in FIG. 4B, after the items 40-1, 40-2, 40-3, 40-4 have been positioned adjacent to one another, the items 40-1, 40-2, 40-3, 40-4 may be joined by a binding agent 425, which may be any paper, plastic, rubber, metallic or semi-metallic materials, such as shrink wrap (e.g., a polymeric plastic film), bubble wrap, rubber bands, adhesives, sheets of cellophane, paper or metallic or semi-metallic foils, or the like. The binding agent 425 is provided about a roll, from which one or more lengths may be removed and wrapped, enveloped or shrouded about the items 40-1, 40-2, 40-3, 40-4 in any manner, e.g., around any circumference of the items 40-1, 40-2, 40-3, 40-4, or about any axis of the items 40-1, 40-2, 40-3, 40-4. Alternatively, in addition to sheets of paper, plastic, rubber, metallic or semi-metallic materials, any other type of binding agent may be used to bind the items 40-1, 40-2, 40-3, 40-4 to one another.

The placement of the binding agent 425 on or around the items 40-1, 40-2, 40-3, 40-4 in any given manner may define a bundle having a unique visual appearance, from which a unique digital identifier for the bundle may be defined. The visual appearances may be determined based at least in part on material properties of the binding agent 425, or locations, alignments or numbers of the lengths of the binding agent 425 on or around the items 40-1, 40-2, 40-3, 40-4.

For example, as is shown in FIG. 4B, a first bundle 45A of the items 40-1, 40-2, 40-3, 40-4 may be formed by wrapping a length 42A of the binding agent 425 multiple times about a longitudinal axis defined by the items 40-1, 40-2, 40-3, 40-4 in a substantially common location. A second bundle 45B of the items 40-1, 40-2, 40-3, 40-4 may be formed by wrapping two lengths 42B-1, 42B-2 of the binding agent 425 about the longitudinal axis defined by the items 40-1, 40-2, 40-3, 40-4 in different locations. A third bundle 45C of the items 40-1, 40-2, 40-3, 40-4 may be formed by wrapping one length 42C-1 of the binding agent 425 about the longitudinal axis defined by the items 40-1, 40-2, 40-3, 40-4, and another length 42C-2 of the binding agent about a transverse axis defined by the items 40-1, 40-2, 40-3, 40-4. Any manner by which a binding agent is used to sufficiently wrap one or more items, or to combine two or more items, shall cause a resulting bundle to have a unique visual appearance that may be represented in imaging data (e.g., visual imaging data and/or depth imaging data) captured by the imaging device 440. Such imaging data may be used to define, at least in part, a unique digital identifier for the bundle.

Figure 5C:
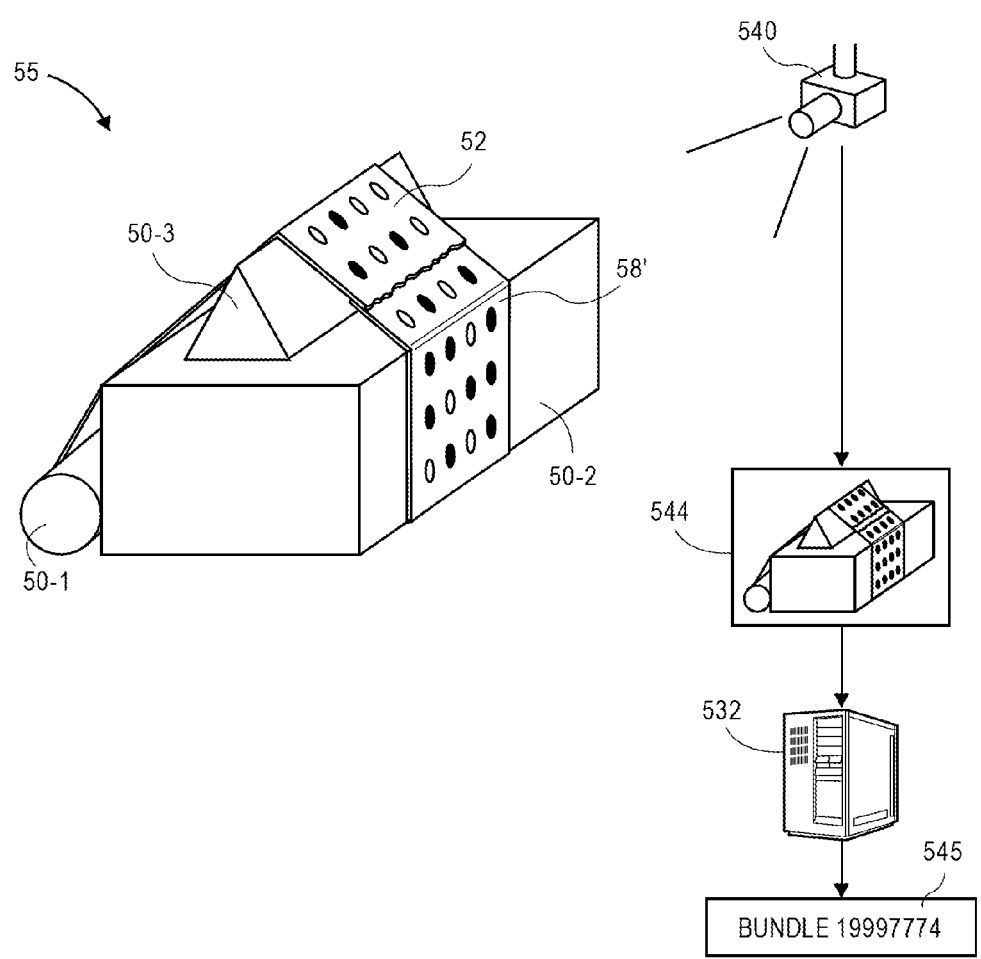

In order to further enhance the unique visual appearance of a bundle of items that has been combined or bound by a binding agent, the binding agent may be stamped, printed, painted, embossed or otherwise marked with one or more markings, which may be regular or irregular in nature. Referring to FIGS. 5A, 5B and 5C, views of aspects of a system for bundled unit identification or tracking in accordance with embodiments of the present disclosure are shown. Except where otherwise noted, reference numerals preceded by the number "5" shown in FIGS. 5A, 5B and 5C indicate components or features that are similar to components or features having reference numerals preceded by the number "4" shown in FIG. 4A or FIG. 4B, by the number "2" shown in FIG. 2, or by the number "1" shown in FIGS. 1A through 1H.

Where a length of binding agent is marked with a pattern that does not repeat, or repeats infrequently, such as the pattern 58, the binding agent will further enhance the appearance of a bundle of items bound by the binding agent, further increasing the likelihood that imaging data captured from the bundle of items will be unique in nature and different from imaging data captured from any other bundle of items, even if the bundles include identical items that are aligned in an identical manner prior to wrapping the items with the binding agent, such as the bundles 45A, 45B, 45C of FIG. 4B. As is shown in FIG. 5A, a length 52 of binding agent may be marked with a non-repeating pattern 58 of dots on an external surface. In some embodiments, a non-repeating (or irregular) pattern, or a pattern that repeats infrequently, may be particularly advantageous when the binding agent is wrapped, enveloped or shrouded in tension around one or more items. As is shown in FIG. 5B, the length 52 of binding agent of FIG. 5A is placed in tension, and a distorted pattern 58' resulting from a stretching of the pattern 58 appears within the length 52 of binding agent. Because every bundle of one or more items may be different from one another, and because a bundle of one or more items may be wrapped, enveloped or shrouded by a binding agent in different locations or orientations, the pattern 58 of the length 52 of the binding agent of FIG. 5A will be distorted in a unique manner based on the features of the underlying items (e.g., sizes, shapes or surface features of such items), and the extent of tension applied to the length 52 of the binding agent when the bundle is wrapped, enveloped or shrouded thereby.

As is shown in FIG. 5C, when the length 52 of the binding agent has been wrapped around a plurality of items 50-1, 50-2, 50-3, an image 544 of a bundle 55 including the items 50-1, 50-2, 50-3 with the length 52 and the distorted pattern 58' thereon may be captured using an imaging device 540 and transferred to a server 532 or other computer device, where the image 544 may be processed and stored by the server 532 along with an alphanumeric digital identifier 545 or any other information or data regarding the bundle 55, the items 50-1, 50-2, 50-3, an order associated with the bundle 55 or the items 50-1, 50-2, 50-3, or any other relevant factor.

Figure 6A:
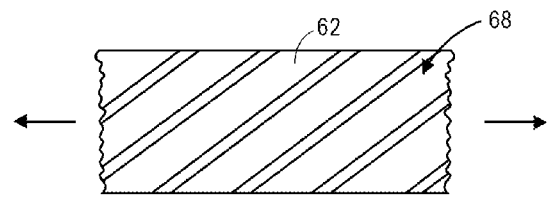
FIGS. 6A and 6B are views of aspects of a system for bundled unit identification or tracking in accordance with embodiments of the present disclosure.
Figure 6B:
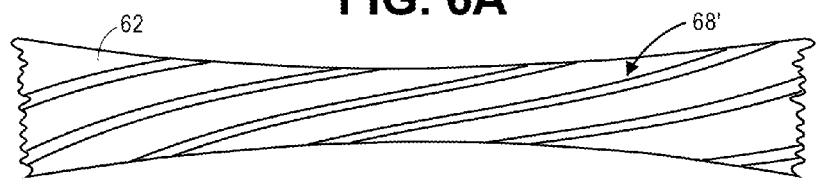

Any type of pattern may be provided on an outer surface of a length of a binding agent, including the irregular or non-repeating (or infrequently repeating) pattern on the length 52 of binding agent shown in FIGS. 5A and 5B, or one or more regular or repeating patterns. Referring to FIGS. 6A and 6B, views of aspects of a system for bundled unit identification or tracking in accordance with embodiments of the present disclosure are shown. Except where otherwise noted, reference numerals preceded by the number "6" shown in FIGS. 6A and 6B indicate components or features that are similar to components or features having reference numerals preceded by the number "5" shown in FIGS. 5A, 5B and 5C, by the number "4" shown in FIG. 4A or FIG. 4B, by the number "2" shown in FIG. 2, or by the number "1" shown in FIGS. 1A through 1H.

As is shown in FIG. 6A, a length 62 of binding agent may be marked with a repeating pattern 68 of parallel lines on an external surface. In some embodiments, the existence of the pattern 68 may be particularly advantageous when the binding agent is wrapped, enveloped or shrouded in tension around two or more items. As is shown in FIG. 6B, the length 62 of binding agent of FIG. 6A is placed in tension, and a distorted pattern 68' resulting from a stretching of the pattern 68 appears within the length 62 of the binding agent. Thus, despite the fact that the pattern 68 of the length 62 of binding agent is repeating or regular, placing the length 62 of binding agent of FIG. 6A in tension, in a unique manner, around two or more items may result in a unique distorted pattern, viz., the distorted pattern 68', to result, with the features or attributes of the distorted pattern being determined as a function of the dimensions, materials and/or material properties of the binding agent from which the length 62 was cut.

Figure 7A:
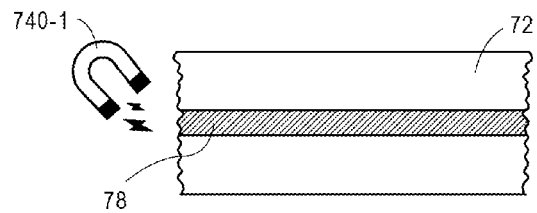
FIGS. 7A and 7B are views of aspects of a system for bundled unit identification or tracking in accordance with embodiments of the present disclosure.
Figure 7B:
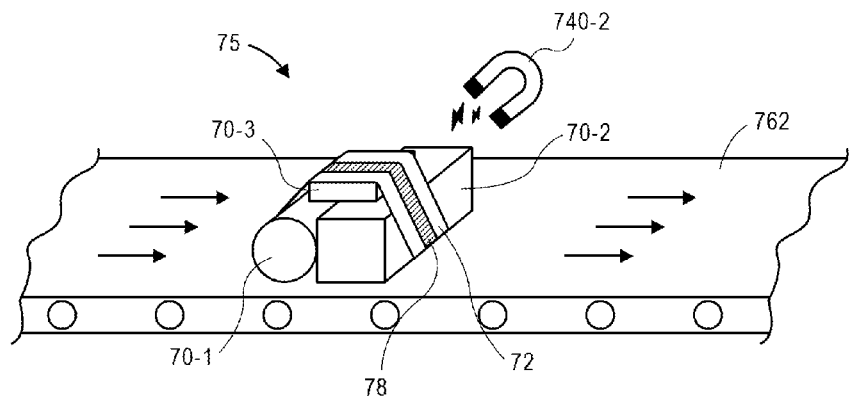

Additionally, a binding agent may be further modified in order to enhance the ability of the binding agent to be sensed when the binding agent is used to combine a plurality of items into a bundle, and the likelihood that a unique digital identifier may be generated and recognized therefrom. Referring to FIGS. 7A and 7B, views of aspects of a system for bundled unit identification or tracking with embodiments of the present disclosure are shown. Except where otherwise noted, reference numerals preceded by the number "7" shown in FIGS. 7A and 7B indicate components or features that are similar to components or features having reference numerals preceded by the number "6" shown in FIGS. 6A and 6B, by the number "5" shown in FIGS. 5A, 5B and 5C, by the number "4" shown in FIG. 4A or FIG. 4B, by the number "2" shown in FIG. 2, or by the number "1" shown in FIGS. 1A through 1H.

As is shown in FIG. 7A, a magnetic strip 78 is applied to a length 72 of binding agent. The magnetic strip 78 may be magnetized to store data including a unique digital identifier thereon by exposing the magnetic strip 78 to a sufficiently strong magnetic field, e.g., by a magnetic source 740-1, prior to or after the length 72 has been wrapped, enveloped or shrouded around a plurality of items to form a bundle. As is shown in FIG. 7B, when a bundle 75 including a plurality of items 70-1, 70-2 that are joined by the length 72 of the binding agent passes within an active range of a magnetic sensor 740-2, e.g., while traveling on a conveyor 762, the magnetic sensor 740-2 may sense the magnetic strip 78 and identify the bundle 75 based on the unique digital identifier stored thereon.

A bundle of items may be recognized based on a unique digital identifier by generating the unique digital identifier based on information or data (e.g., imaging data) captured from the bundle of items after the bundle of items has been wrapped, enveloped or shrouded by a binding agent, and comparing the unique digital identifier and, optionally, any other information or data regarding the bundle of items to any of a plurality of unique digital identifiers and, optionally, any other information or data associated with bundles of items that are stored in one or more data stores, e.g., according to any image comparison (or image mapping) algorithm or technique. When a bundle of items is recognized based on a unique digital identifier and, optionally, any other information or data, to a sufficiently high degree of confidence or accuracy, the recognition of the bundle may be used for any purpose, including but not limited to triggering the performance of one or more subsequent actions. In some embodiments, a common container for a bundle of items may be identified after the bundle has been recognized based on a unique digital identifier. For example, the common container for the bundle may be identified according to attributes of the bundle, of the individual items in the bundle, or of an order with which the bundle and one or more of the individual items is associated. Such attributes may be stored in association with a unique digital identifier and accessed after the unique digital identifier of the bundle has been recognized.

Figure 8A:
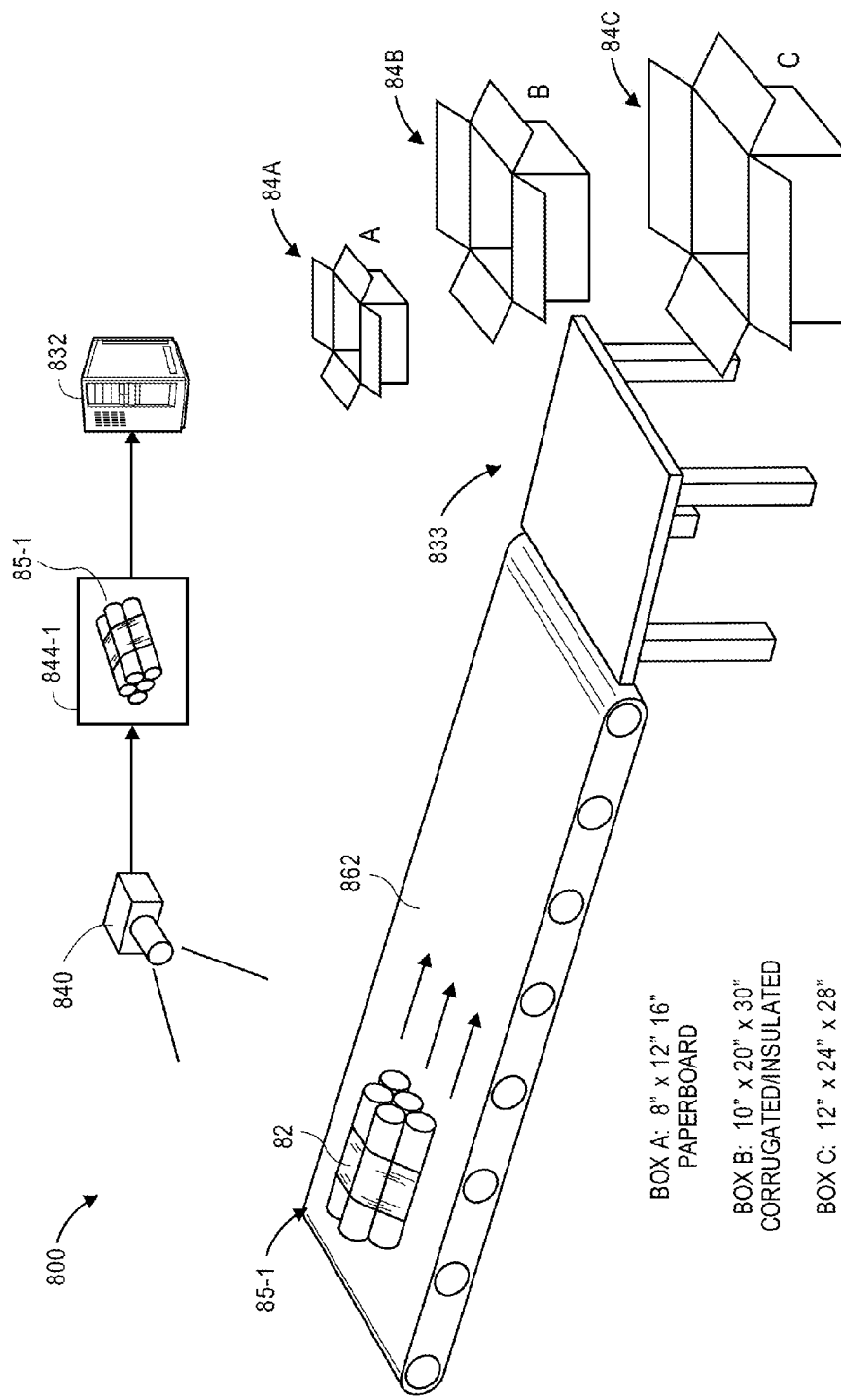
FIGS. 8A and 8B are views of aspects of a system for bundled unit identification or tracking in accordance with embodiments of the present disclosure.
Figure 8B:
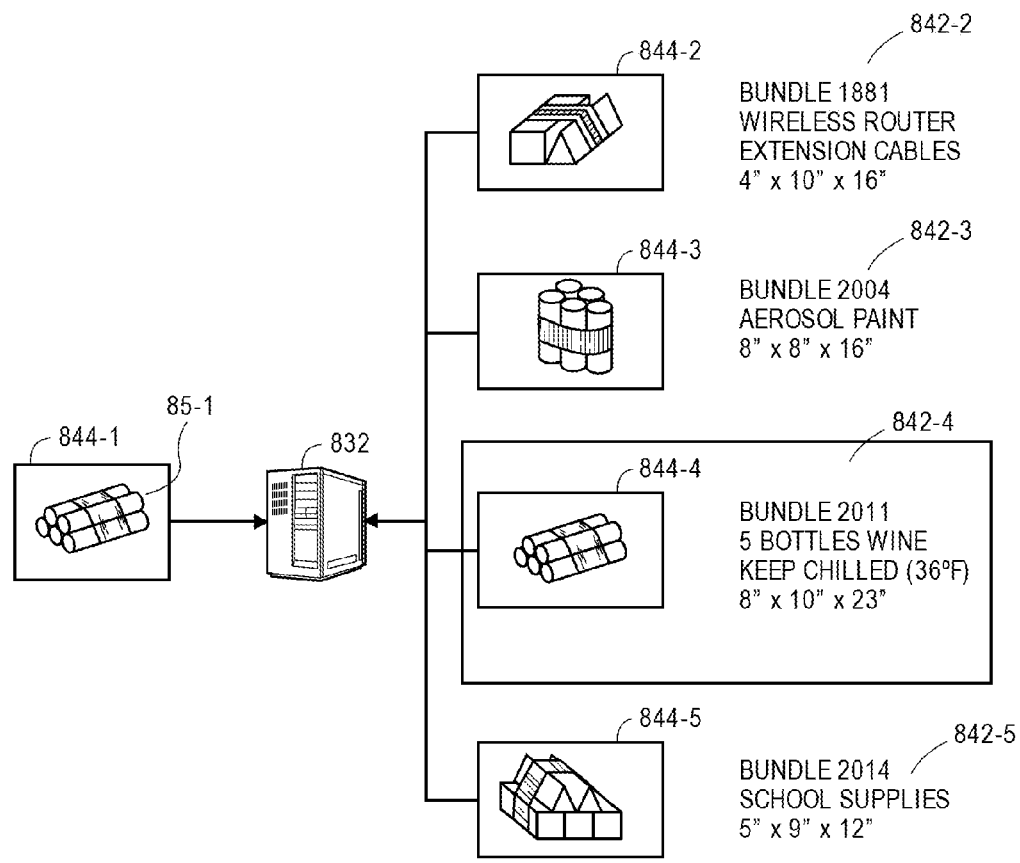

Referring to FIGS. 8A and 8B, views of aspects of a system for bundled unit identification or tracking in accordance with embodiments of the present disclosure are shown. Except where otherwise noted, reference numerals preceded by the number "8" shown in FIGS. 8A and 8B indicate components or features that are similar to components or features having reference numerals preceded by the number "7" shown in FIGS. 7A and 7B, by the number "6" shown in FIGS. 6A and 6B, by the number "5" shown in FIGS. 5A, 5B and 5C, by the number "4" shown in FIG. 4A or FIG. 4B, by the number "2" shown in FIG. 2, or by the number "1" shown in FIGS. 1A through 1H.

As is shown in FIG. 8A, a system 800 including a computer server 832, an imaging device 840 and a conveyor 862 having a terminus at a packing station 833 is shown. At least a portion of the conveyor 862 passes within a field of view of the imaging device 840. A bundle 85-1 of items joined by a length 82 of binding agent travels along the conveyor 862, within the field of view of the imaging device 840, en route to the packing station 833, where a plurality of different boxes 84A, 84B, 84C are available for packing and shipping the bundle 85-1. The box 84A is a paperboard box having a height of eight inches, a length of twelve inches and a width of sixteen inches. The box 84B is an insulated box formed from corrugated cardboard that has a height of ten inches, a length of twenty inches and a width of thirty inches. The box 84C is a heavy duty box, also formed from corrugated cardboard, that has a height of twelve inches, a length of twenty-four inches and a width of twenty-eight inches.

In accordance with embodiments of the present disclosure, a bundle of items that is bound by a binding agent, such as the bundle 85-1 and the length 82 of the binding agent shown in FIG. 8A, may be identified by capturing information or data (e.g., imaging data) regarding the bundle using a sensor, e.g., the imaging device 840 of FIG. 8A, and comparing the captured information or data to previously captured and stored information or data regarding a plurality of bundles of items, including one or more unique digital identifiers of such items. As is shown in FIG. 8A, the imaging device 840 may capture an image 844-1 of the bundle 85-1, and transfer the image 844-1 of the bundle 85-1 to the server 832. The image 844-1 may be a visual image (e.g., an RGB or grayscale image), a depth image (e.g., a point cloud or other depth representation), or imaging data including visual and depth components. In some embodiments, the comparison may involve generating a unique digital identifier for the bundle based on the captured information or data, e.g., the image 844-1, and comparing the generated unique digital identifier to a plurality of unique digital identifiers of bundles stored in a data store. In some other embodiments, one or more pixels or regions of pixels of the image 844-1 may be or include the unique digital identifier, and the image 844-1 or portions thereof may be compared to images or portions of images stored in one or more data stores.

As is shown in FIG. 8B, the server 832 may compare the image 844-1 of the bundle 85-1 to a plurality of images 844-2, 844-3, 844-4, 844-5 of bundles, which may be stored on the server 832, or in locations accessible to the server 832, along with information 842-2, 842-3, 842-4, 842-5 regarding the corresponding bundles. Thus, based on comparisons of unique digital identifiers to unique digital identifiers, or of images to images, a match for the bundle 85-1 may be identified to a sufficiently high degree of confidence or accuracy, and information corresponding to the bundle 85-1 may be efficiently accessed accordingly. For example, as is shown in FIG. 8B, the image 844-1 of the bundle 85-1 corresponds most closely to the image 844-4 stored on the server 832. Therefore, the information 842-4 stored in association with the image 844-4 corresponds to the bundle 85-1, and may thus be used to select one of the boxes 84A, 84B, 84C for shipping the bundle to an intended destination. As is shown in FIG. 8B, the bundle 85-1 includes five bottles of wine that are to be kept chilled at approximately thirty-six degrees Fahrenheit (36° F.) having an overall height of eight inches, an overall length of ten inches, and an overall width of twenty-three inches. Accordingly, the box 84B is the best option for shipping the bundle 85-1 to an intended destination, at least because the bundle 85-1 will not fit into the box 84A, and because the box 84C is uninsulated and, therefore, unable to maintain the bundle 85-1 at a desired temperature.

As is discussed above, a digital identifier may be based on or comprise imaging data captured from a bundle of items, including but not limited to imaging data corresponding to a binding agent that binds or combines the items into the bundle. The imaging data may be identified by comparing images of items captured prior to and after combining the items into the bundle, with a net digital difference between the images defining the portions of the imaging data corresponding exclusively to the bundle and binding agent, which may have many uniquely shaped and sized facets and faces as the binding agent is wrapped, enveloped or shrouded around the individual items. Subsequently, images captured of a plurality of bundles or other objects may be evaluated to determine whether such images include the imaging data corresponding exclusively to the binding agent. If a match between digital identifiers of bundles or between imaging data of bundles may be identified with a sufficiently high degree of confidence or accuracy, then attributes of a bundle, of items included in the bundle, or of an order with which the bundle or one or more of the items is associated may be identified accordingly. If a match between the digital identifiers or the imaging data may not be identified with a sufficiently high degree of confidence or accuracy, or if digital identifiers or imaging data of two or more bundles are determined to be equally likely to match or correspond to a digital identifier or imaging data of a given bundle based on such comparisons, then other information or data (e.g., any information or data obtained or extracted based on imaging data) may be consulted or compared in order to identify a most likely match with the given bundle.

Figure 9:
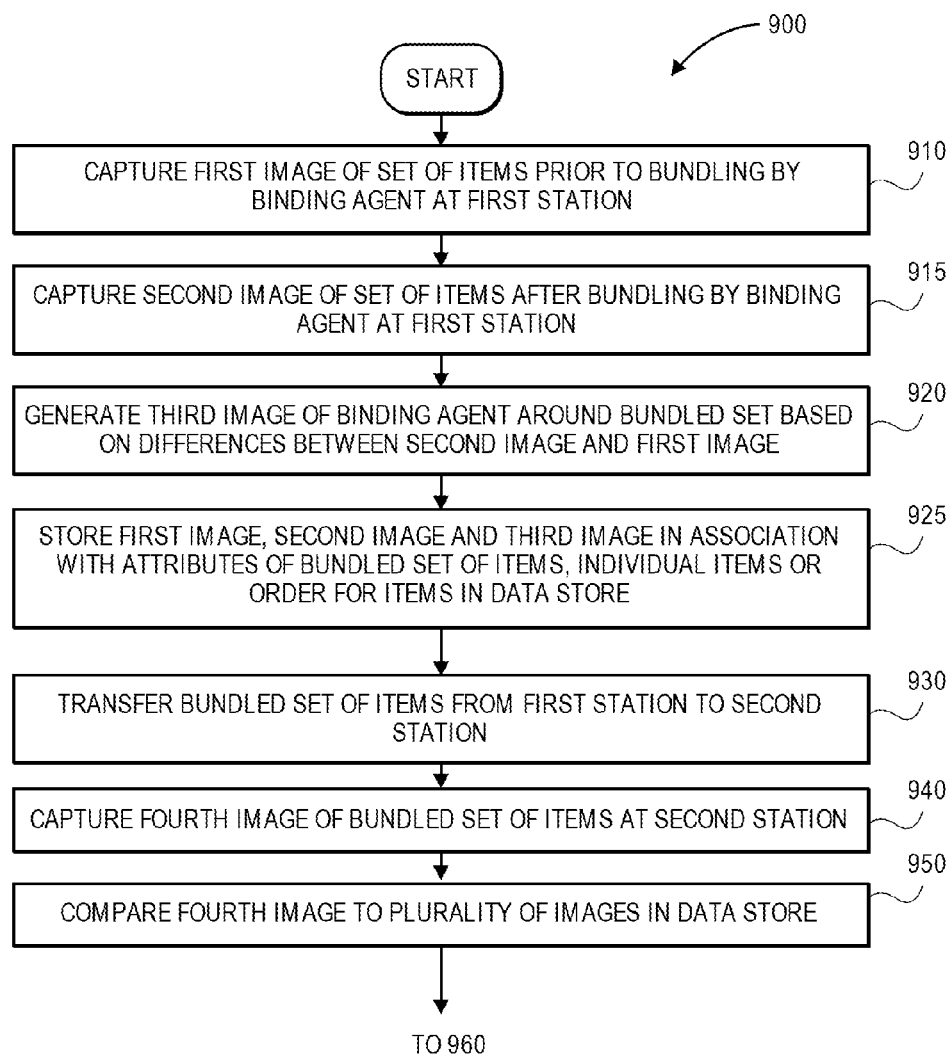
FIG. 9 is a flow chart of one process for bundled unit identification or tracking in accordance with embodiments of the present disclosure.
Figure 9:
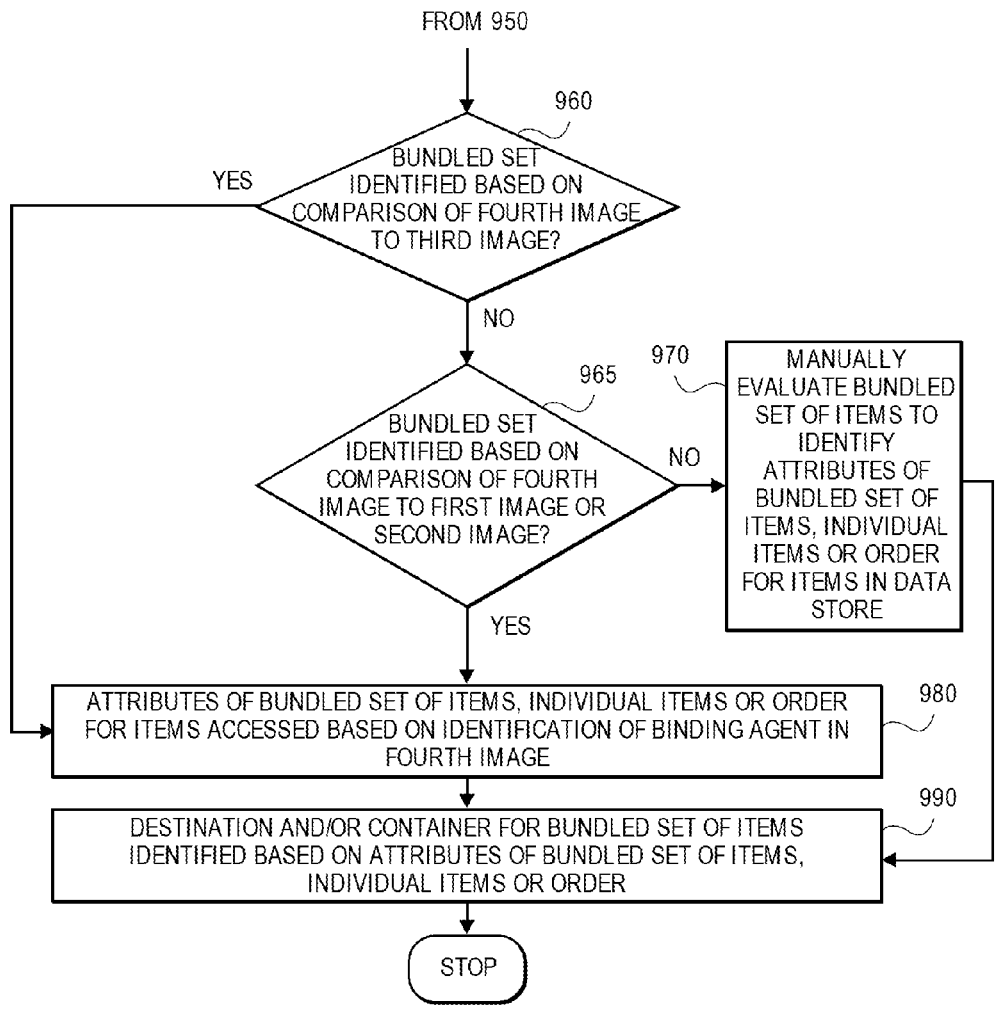

Referring to FIG. 9, a flow chart 900 representing one process for bundled unit identification or tracking in accordance with embodiments of the present disclosure is shown. At box 910, a first image of a set of items is captured at a first station, prior to a bundling of the items by a binding agent. For example, the items may be placed (e.g., stacked) on a working surface at the first station, and a plurality of images may be captured of the items from one or more perspectives or angles, e.g., by the imaging device 140-1 of FIG. 1A. At box 915, a second image of the set of items is captured after the bundling of the items by the binding agent. For example, a binding agent may be wrapped, shrouded or enveloped around a circumference of the stack of the items, or about an axis of the stack, until the items are sufficiently bound to one another, by one or more humans or machines. The binding agents may be shrink wrap, bubble wrap, rubber bands, sheets of cellophane, paper or metallic or semi-metallic foils, or the like.

At box 920, a third image of the binding agent around the bundled set of items is generated a net difference between the second image and the first image. The third image may comprise an image pixel difference between the values of the pixels of the first image (which was captured prior to wrapping, enveloping or shrouding the items by the binding agent) are subtracted from the values of the pixels of the second image (which was captured after wrapping, enveloping or shrouding the items by the binding agent). The values of the pixels may correspond to values in a single color channel (e.g., black and white or grayscale images) or multiple color channels (e.g., RGB images) having any number of bits. Any image subtraction (or pixel subtraction) algorithm or technique may be utilized to generate the third image in accordance with the present disclosure. The third image of the binding agent may thus comprise all or a portion of a digital identifier of the bundled set of items.

At box 925, the first image, the second image and the third image are stored in association with attributes of the bundled set of items, the individual items of the bundle, or an order with which the bundle or the individual items are associated.

The attributes may relate to any aspect of the bundle, the items or the order, including dimensions, destinations, handling requirements or the like, for the bundle or one or more of the items. Additionally, any information or data regarding the bundled set of items, including but not limited to information or data gathered or extracted from the first image, the second image and/or the third image (e.g., any edges, contours, outlines, colors, textures, silhouettes, shapes or other characteristics of the bundles, the items or the binding agent that may be identified therefrom) may also be stored in association with the first image, the second image, the third image and the associated attributes.

At box 930, the bundled set of items is transferred from the first station to a second station where, at box 940, a fourth image of the bundled set of items is captured. For example, referring again to FIG. 1F, one or more images of the bundle 15 may be captured by the imaging device 140-2, upon an arrival of the bundle 15 at the packing station 133 from the preparation station 131, or by any number of imaging devices provided in any alignment or configuration.

At box 950, the fourth image is compared to a plurality of images in the data store, e.g., by one or more image comparison algorithm techniques such as MSE or SSIM. At box 960, whether the bundled set is identified based on a comparison of the fourth image to the third image, e.g., of the binding agent, is determined. Alternatively, or optionally, the first image, which was captured of the set of items prior to their bundling, may be subtracted from the fourth image, which includes a bundled set of items and a binding agent, and the difference between the fourth image and the first image may be compared to the third image. If the bundled set of items shown in the fourth image corresponds to the bundled set of items shown in the second image, then difference between the fourth image and the first image will correspond directly to the third image.

For example, if the unique facets and faces of the binding agent wrapped, enveloped or shrouded around the set of items, as shown in the third image, are present within the fourth image, then the fourth image may be presumed to include not only the binding agent but also the set of items, and the bundled set of items may be recognized within the fourth image accordingly, and the process advances to box 980, where attributes of the bundled set of items, or the individual items within the bundled set, or an order for the items may be automatically accessed. Where such attributes are stored in association with the image embodying the binding agent, e.g., in one or more data stores, such attributes may be rapidly and efficiently accessed, without having to dissemble the bundled set of items, once the binding agent corresponding to such attributes is identified. At box 990, a destination and/or a container for the bundled set of items may be identified based on such attributes, and the process ends.

If the bundled set is not identified based on a comparison of the fourth image to the third image, e.g., of the binding agent, then the process advances to box 965, where whether the bundled set of items is identified based on a comparison of the fourth image to the first image or the second image, e.g., of the set of items prior to and after bundling by the binding agent, is determined. Any number of attributes or other features of the set of items, or one or more of the individual items, that are expressed in the first image or the second image may be used to recognize the bundled set of items shown in the fourth image as corresponding to the set of items shown, either unbundled or bundled, in the first image or second image, respectively. For example, information regarding dimensions (e.g., lengths, widths, heights or volumes), colors, textures, shapes or other features may be extracted from the first image or the second image and compared against corresponding dimensions, colors, textures, shapes or other features extracted from the fourth image. Such a comparison may be particularly useful in identifying one of a plurality of bundles corresponding to a given bundle in situations where two or more of the bundles are identified as equally likely to match the given bundle, or if two or more bundles are identified as matching the given bundle to sufficiently high degrees of confidence or accuracy, e.g., at box 960, or in any other scenario. Alternatively, or optionally, the first image, which was captured of the set of items prior to their bundling, may be subtracted from the fourth image, which includes a bundled set of items and a binding agent, and the difference between the fourth image and the first image may be compared to the third image. If the bundled set of items shown in the fourth image corresponds to the bundled set of items shown in the second image, then difference between the fourth image and the first image will correspond directly to the third image.

If the bundled set is identified based on the comparison of the fourth image to the first image or the second image, then the process advances to box 980, where attributes of the bundled set of items, the individual items within the bundled set, or an order for the items may be automatically accessed, and to box 990, where a destination and/or a container for the bundled set of items may be identified based on such attributes.

If the binding agent of the third image is not identified based on a comparison of the fourth image to the first image or the second image at box 965, then the process advances to box 970, where the bundled set of items is manually evaluated in order to identify attributes of the bundled set of items, or the individual items in the bundled set, or an order with which the bundled set of items, or one or more of the individual items, is associated, and to box 990, where a destination and/or a container for the bundled set of items is identified based on the automatically accessed attributes, and the process ends.

Figure 10A:
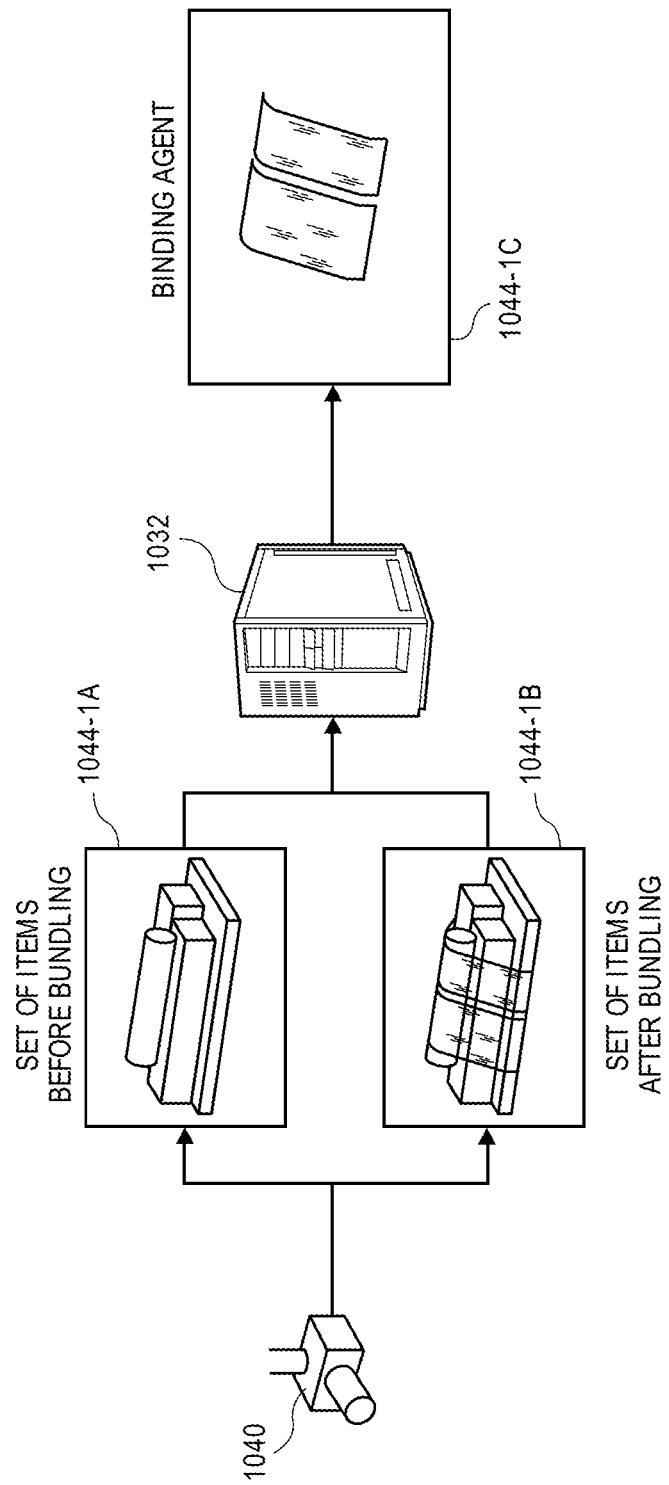
FIGS. 10A, 10B and 10C are views of aspects of a system for bundled unit identification or tracking in accordance with embodiments of the present disclosure.
Figure 10B:
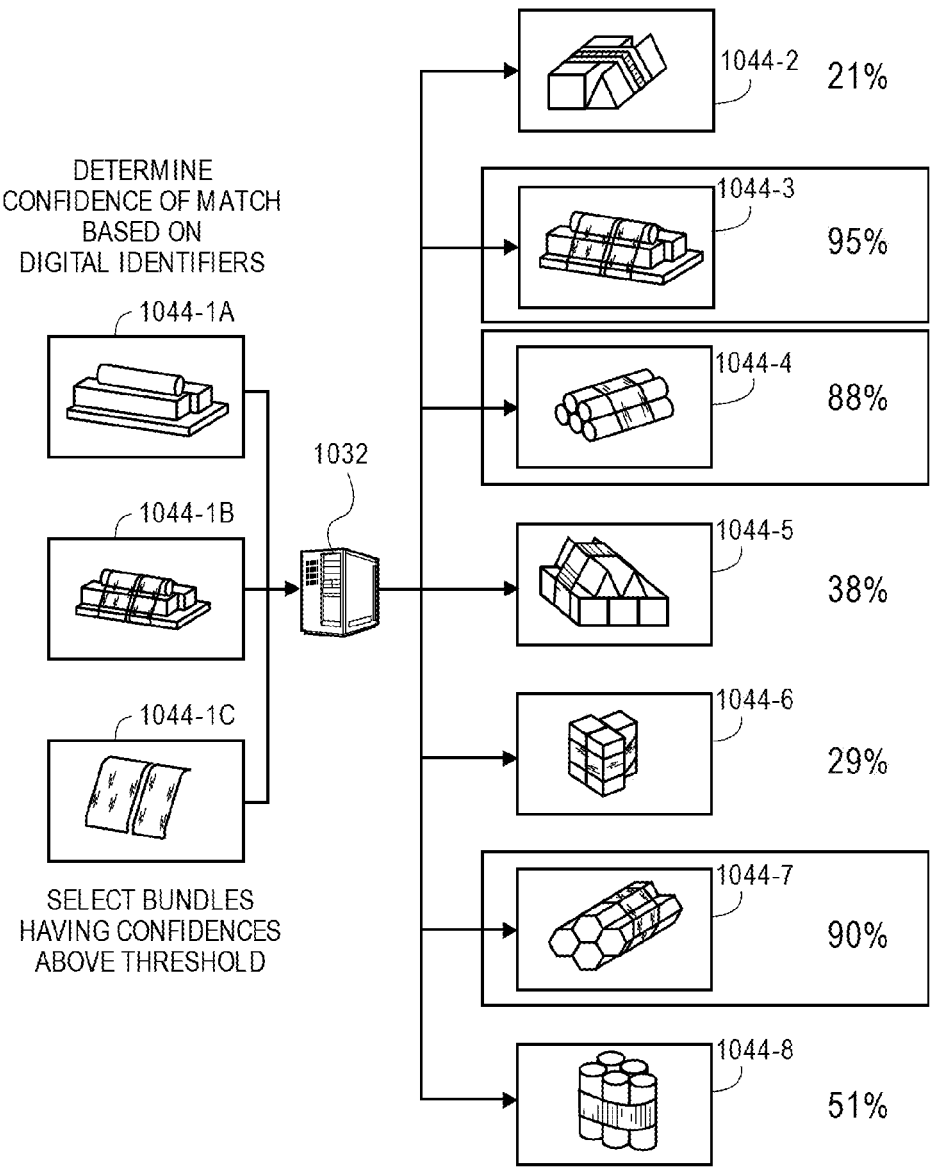
Figure 10C:
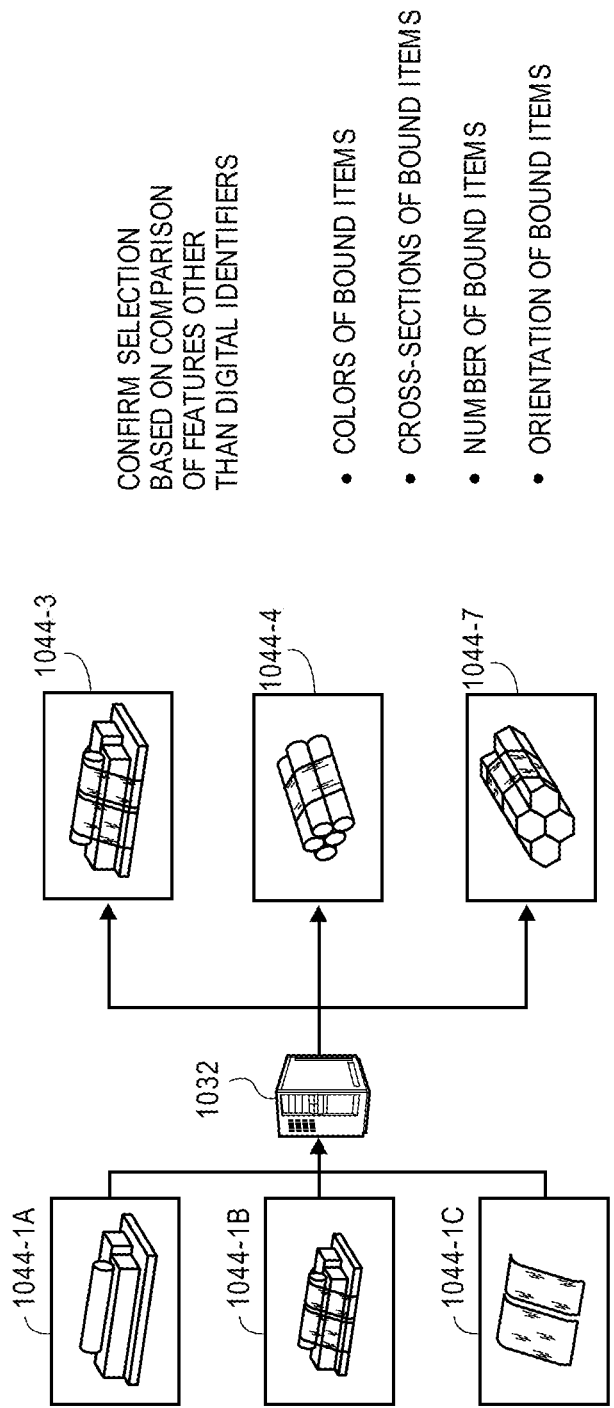

By defining digital identifiers based on images or portions of images of bundles corresponding to binding agents that are used to form such bundles from groups of items, rather than the images in their entirety, processes for recognizing a bundle based on a comparison of digital identifiers may be further enhanced and accelerated. Referring to FIGS. 10A, 10B and 10C, views of aspects of a system for bundled unit identification or tracking in accordance with embodiments of the present disclosure are shown. Except where otherwise noted, reference numerals preceded by the number "10" shown in FIGS. 10A, 10B and 10C indicate components or features that are similar to components or features having reference numerals preceded by the number "8" shown in FIGS. 8A and 8B, by the number "7" shown in FIGS. 7A and 7B, by the number "6" shown in FIGS. 6A and 6B, by the number "5" shown in FIGS. 5A, 5B and 5C, by the number "4" shown in FIG. 4A or FIG. 4B, by the number "2" shown in FIG. 2, or by the number "1" shown in FIGS. 1A through 1H.

As is shown in FIG. 10A, an imaging device 1040 may be aligned to capture a plurality of images of a set of items, including a first image 1044-1A of the set of items prior to bundling, and a second image 1044-1B of the set of items after bundling. The plurality of images, including at least the first image 1044-1A and the second image 1044-1B, may be provided to a computer server 1032 or other computer device, where a third image 1044-1C representing a binding agent used to bundle the set of items is derived based on a difference between the first image 1044-1A and the second image 1044-1B. The third image 1044-1C representing the binding agent used to combine the items into the bundle may be derived according to any type or form of image subtraction (or pixel subtraction) algorithm or technique, and may thus act as a digital identifier of the bundle.

As is discussed above, sets of items that are wrapped, enveloped or shrouded in a binding agent may be identified on a multi-level or a multi-stage basis. As a digital identifier, the third image 1044-1C may thus be compared to images of a plurality of bundles of items (e.g., bundles of items traveling along a conveyor, such as the conveyor 162 of FIG. 1A), in order to determine which of such bundles includes the binding agent shown in the third image 1044-1C. As is shown in FIG. 10B, the third image 1044-1C may be compared to any number of other images 1044-2, 1044-3, 1044-4, 1044-5, 1044-6, 1044-7, 1044-8 captured of bundles, e.g., according to any image comparison or image mapping algorithms and techniques, until any images that are believed to include the binding agent represented in the third image 1044-1C are identified to a sufficiently high degree of confidence or accuracy.

If none of the images 1044-2, 1044-3, 1044-4, 1044-5, 1044-6, 1044-7, 1044-8 is determined to include the binding agent represented in the third image 1044-1C to a sufficiently high degree of confidence or accuracy, based on the comparison of the third image 1044-1C to the images 1044-2, 1044-3, 1044-4, 1044-5, 1044-6, 1044-7, 1044-8 alone, or if two or more images 1044-2, 1044-3, 1044-4, 1044-5, 1044-6, 1044-7, 1044-8 are determined to be equally likely to include the binding agent represented in the third image 1044-1C, then additional information regarding the bundled set of items shown in the second image 1044-1B may be used to determine which of the images 1044-2, 1044-3, 1044-4, 1044-5, 1044-6, 1044-7, 1044-8 of bundles most likely includes the bundled set of items shown in the second image 1044-1B. For example, information regarding dimensions (e.g., lengths, widths, heights or volumes), colors, textures, shapes or other features of the set of items shown in the first image 1044-1A or the second image 1044-1B may be compared to information regarding dimensions, colors, textures, shapes or other features of bundles shown within one or more of the images 1044-2, 1044-3, 1044-4, 1044-5, 1044-6, 1044-7, 1044-8.

As is shown in FIG. 10B, the images 1044-3, 1044-4, 1044-7 are determined to include the binding agent represented in the third image 1044-1C to confidence levels of ninety-five percent (95%), eighty-eight percent (88%) and ninety percent (90%), respectively, while the images 1044-2, 1044-5, 1044-6, 1044-8 are determined to include the binding agent at significantly lower confidence levels ranging from twenty-one percent (21%) to fifty-one percent (51%). Therefore, because the confidence levels associated with matches of the images 1044-3, 1044-4, 1044-7 to the third image 1044-1C are not only sufficiently high but also statistically proximate to one another, the comparison of the third image 1044-1C to the images 1044-2, 1044-3, 1044-4, 1044-5, 1044-6, 1044-7, 1044-8 effectively filtered the images 1044-3, 1044-4, 1044-7 therefrom as being most likely to include the bundled set of items shown in the second image 1044-1B. Information or data regarding the set of items shown in the shown in the first image 1044-1A or the second image 1044-1B captured prior to and after bundling, e.g., dimensions, colors, textures, shapes or other features of the items, other than the digital identifier (e.g., the binding agent shown in the third image 1044-1C), may then be compared to corresponding information or data regarding the contents of the images 1044-3, 1044-4, 1044-7, in order to determine which of the images 1044-3, 1044-4, 1044-7 most appropriately corresponds to the bundled set of items shown in the second image 1044-1B.

As is shown in FIG. 10C, based on a comparison of features of the bundled set other than the digital identifier (e.g., the binding agent shown in the third image 1044-1C), to corresponding features of images of other bundles shown in the images 1044-3, 1044-4, 1044-7, such as colors, cross-sections, numbers or orientations of the bound items, as identified from the first image 1044-1A or the second image 1044-1B, the image 1044-3 is determined to most closely correspond to the bundled set shown in the second image 1044-1B. Once the image 1044-3 is identified as corresponding to the bundled set of items shown in the second image 1044-1B, information stored in association with the image 1044-3 may be determined to be associated with that bundled set, and may thus be utilized for any relevant purpose, including but not limited to determining an identity of a customer who purchased the items in the bundle, an intended destination for such items, or attributes of the bundle or the respective items, which may be further utilized to identify a common container for the bundle, or specific instructions for handling one or more of the items included in the bundle.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein refer to generating unique digital identifiers for bundles of a plurality of items that are wrapped, enveloped or shrouded by a binding agent, the systems and methods of the present disclosure are not so limited, and may be utilized to generate unique digital identifiers for a bundle that consists of a single item and one or more binding agents. In some embodiments, a single item or container of items, such a specific suitcase or another piece of luggage, may be wrapped at least in part by a binding agent, e.g., a rubber band, and imaging data captured of the specific suitcase may be processed in order to generate a unique digital identifier thereof based on such imaging data. Thereafter, the specific suitcase may be passed through inspection equipment, e.g., at a checkpoint, along with any number of other pieces of luggage. Imaging data captured of the various pieces of luggage passing through the inspection equipment at the checkpoint may be processed and compared to the unique digital identifier of the luggage bound by the binding agent, in order to determine which of the various pieces of luggage is the specific suitcase.

Additionally, in some embodiments, a match between imaging data or other information or data regarding bundles may be determined based exclusively on comparisons of digital identifiers generated based on such data after such bundles have been wrapped, enveloped or shrouded with one or more binding agents. In some other embodiments, matches may be determined based on comparisons of digital identifiers, and also on comparisons of other information or data regarding such bundles. Moreover, in some embodiments, a bundle may be recognized based on digital identifiers generated from images captured by one or more imaging devices at different times, or from images captured by one or more imaging devices in different locations.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3 and 9, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an application-specific integrated circuit, or ASIC, which can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A computer-implemented method comprising:
   capturing at least a first image of at least a portion of a first bundled set of items by a first imaging device at a first time, wherein the first bundled set of items comprises at least a first item wrapped at least in part by a first binding agent, wherein the portion of the first bundled set of items includes a portion of the first binding agent, and wherein the first bundled set of items is in a first location at the first time;
   generating a first digital identifier of the first bundled set of items based at least in part on the first image by at least one computer processor;
   identifying information regarding the first bundled set of items by the at least one computer processor;
   storing the information regarding the first bundled set of items in association with the first digital identifier in the at least one data store;
   causing the first bundled set of items to be transported from the first location to a second location prior to a second time;
   capturing at least a second image of at least the portion of the first bundled set of items by a second imaging device at the second time, wherein the first bundled set of items is in the second location at the second time;
   generating a second digital identifier of the first bundled set items based at least in part on the second image by the at least one computer processor;
   identifying a plurality of digital identifiers of bundled sets of items stored in at least one data store, wherein each of the digital identifiers was generated prior to the first time based at least in part on at least one image of a bundled set of items comprising at least one item wrapped at least in part by at least one binding agent;
   performing a comparison of the second digital identifier to at least some of the plurality of digital identifiers according to at least one image comparison algorithm by the at least one computer processor;
   selecting one of the plurality of digital identifiers based at least in part on the comparison of the second digital identifier to the at least some of the plurality of digital identifiers by the at least one computer processor, wherein the selected one of the plurality of digital identifiers is the first digital identifier;

identifying information stored in association with the selected one of the plurality of digital identifiers in the at least one data store, wherein the information stored in association with the selected one of the plurality of digital identifiers is the information regarding the first bundled set of items; and determining that the information stored in association with the selected one of the plurality of digital identifiers in the at least one data store is associated with the first bundled set of items.

2. The computer-implemented method of claim 1, wherein the first digital identifier comprises at least a portion of the first image depicting at least the portion of the first binding agent, and wherein each of the plurality of digital identifiers of bundled sets of items comprises a portion of at least one image of a bundled set of items comprising at least one item wrapped at least in part by at least one binding agent.

3. The computer-implemented method of claim 1, wherein the first image is a first depth image of at least the portion of the first bundled set of items at the first time, and wherein generating the first digital identifier of the first bundled set of items comprises:

generating a first point cloud representative of at least the portion of the first bundled set of items based at least in part on the first depth image by the at least one computer processor, wherein each of the at least some of the plurality of digital identifiers comprises a point cloud of at least a portion of a bundled set of items comprising at least one item wrapped at least in part by at least one binding agent.

4. The computer-implemented method of claim 1, wherein generating the first digital identifier of the first bundled set of items comprises:

capturing at least a third image of at least the first item prior to wrapping at least the first item at least in part by the first binding agent prior to the first time; and generating a fourth image based at least in part on the first image and the third image, wherein the fourth image comprises pixel values corresponding to at least the portion of the first binding agent, and wherein the first digital identifier comprises the fourth image, wherein each of the plurality of digital identifiers of bundled sets of items comprises a portion of an image of a bundled set of items comprising at least one item wrapped at least in part by at least one binding agent prior to the first time, and wherein selecting the one of the plurality of digital identifiers comprises:

selecting the one of the plurality of digital identifiers including the pixel values corresponding to at least the portion of the first binding agent.

5. The computer-implemented method of claim 4, wherein generating the fourth image comprises:

determining differences between pixel values of the third image and pixel values of the first image according to an image subtraction algorithm, wherein the third image comprises the differences between the pixel values of the third image and the pixel values of the first image.

6. The computer-implemented method of claim 1, wherein the information stored in association with the selected one of the plurality of identifiers comprises at least one of:

a first attribute of the first bundled set of items;
a second attribute of the first item; or
a third attribute of an order for at least the first item.

7. The computer-implemented method of claim 6, wherein the first attribute of the first bundled set of items is a dimension of the first bundled set of items, wherein the second attribute is a handling instruction for the first item, and wherein the third attribute is one of a destination for at least the first item or an identity of a customer that placed the order for at least the first item.

8. The computer-implemented method of claim 6, further comprising:

selecting a container for the first bundled set of items based at least in part on the information stored in association with the selected one of the plurality of digital identifiers; and causing the first bundled set of items to be packaged in the selected container.

9. The computer-implemented method of claim 1, wherein the first binding agent comprises a length of at least one of a paper, a plastic, a rubber, a metallic material or a semi-metallic material.

10. The computer-implemented method of claim 1, wherein the first binding agent is wrapped around a first circumference of at least the first item.

11. The computer-implemented method of claim 10, wherein the first bundled set of items further comprises at least one of:

a second binding agent wrapped around the first circumference of at least the first item; or a third binding agent wrapped around a second circumference of at least the first item.

12. The computer-implemented method of claim 1, wherein the first bundled set of items consists of the first item wrapped at least in part by the first binding agent.

13. A computer-implemented method comprising:

capturing at least a first image of at least a portion of a first bundled set of items by a first imaging device at a first time, wherein the first bundled set of items comprises at least a first item wrapped at least in part by a first binding agent, and wherein the portion of the first bundled set of items includes a portion of the first binding agent;

generating a first digital identifier of the first bundled set of items based at least in part on the first image by at least one computer processor;

identifying a plurality of digital identifiers of bundled sets of items stored in at least one data store, wherein each of the digital identifiers was generated prior to the first time based at least in part on at least one image of a bundled set of items comprising at least one item wrapped at least in part by at least one binding agent;

performing a comparison of the first digital identifier to at least some of the plurality of digital identifiers according to at least one image comparison algorithm by the at least one computer processor;

selecting one of the plurality of digital identifiers based at least in part on the comparison to the at least some of the plurality of digital identifiers by the at least one computer processor;

identifying information stored in association with the selected one of the plurality of digital identifiers in the at least one data store;

determining that the information stored in association with the selected one of the plurality of digital identifiers in the at least one data store is associated with the first bundled set of items;

selecting a container for the first bundled set of items based at least in part on the information stored in association with the selected one of the plurality of digital identifiers; and causing the first bundled set of items to be packaged in the selected container.

14. The computer-implemented method of claim 13, further comprising:

capturing at least a second image of at least the portion of the first bundled set of items by a second imaging device at a second time, wherein the second time is prior to the first time;

generating a second digital identifier of the first bundled set of items based at least in part on the second image by the at least one computer processor, wherein the selected one of the plurality of digital identifiers is the second digital identifier;

identifying information regarding the first bundled set of items by the at least one computer processor; and storing the information regarding the first bundled set of items in association with the second digital identifier in the at least one data store, wherein the information regarding the first bundled set of items is the information stored in association with the selected one of the plurality of digital identifiers.

15. The computer-implemented method of claim 14, wherein the first bundled set of items is in a first location at the first time, wherein the first bundled set of items is in a second location at the second time, and wherein the computer-implemented method further comprises:

causing the first bundled set of items to be transported from the second location to the first location prior to the first time.

16. The computer-implemented method of claim 13, wherein the first digital identifier comprises at least the portion of the first image depicting at least a portion of the first binding agent, and wherein each of the plurality of digital identifiers of bundled sets of items comprises a portion of at least one image of a bundled set of items comprising at least one item wrapped at least in part by at least one binding agent.

17. The computer-implemented method of claim 13, wherein the first image is a first depth image of at least the portion of the first bundled set of items at the first time, and wherein generating the first digital identifier of the first bundled set of items comprises:

generating a first point cloud representative of at least the portion of the first bundled set of items based at least in part on the first depth image by the at least one computer processor, wherein each of the at least some of the plurality of digital identifiers comprises a point cloud of at least a portion of a bundled set of items comprising at least one item wrapped at least in part by at least one binding agent.

18. The computer-implemented method of claim 13, wherein generating the first digital identifier of the first bundled set of items comprises:

capturing at least a third image of at least the first item prior to wrapping at least the first item at least in part by the first binding agent prior to the first time;

determining differences between pixel values of the third image and pixel values of the first image according to an image subtraction algorithm; and generating a fourth image based at least in part on the first image and the third image, wherein the fourth image comprises the differences between the pixel values of the third image and the pixel values of the first image, wherein the first digital identifier comprises the fourth image, wherein each of the plurality of digital identifiers of bundled sets of items comprises a portion of an image of a bundled set of items comprising at least one item wrapped at least in part by at least one binding agent prior to the first time, and wherein selecting the one of the plurality of digital identifiers comprises:

selecting the one of the plurality of digital identifiers including the pixel values corresponding to at least the portion of the first binding agent.

19. The computer-implemented method of claim 13, wherein the information stored in association with the selected one of the plurality of identifiers comprises at least one of:

a first attribute of the first bundled set of items, wherein the first attribute of the first bundled set of items is a dimension of the first bundled set of items;

a second attribute of the first item, wherein the second attribute is a handling instruction for the first item; or a third attribute of an order for at least the first item, wherein the third attribute is one of a destination for at least the first item or an identity of a customer that placed the order for at least the first item.

20. The computer-implemented method of claim 13, wherein the first binding agent comprises a length of at least one of a paper, a plastic, a rubber, a metallic material or a semi-metallic material.

21. The computer-implemented method of claim 13, wherein the first binding agent is wrapped around a first circumference of at least the first item, and wherein the first bundled set of items further comprises at least one of:

a second binding agent wrapped around the first circumference of at least the first item; or a third binding agent wrapped around a second circumference of at least the first item.

22. The computer-implemented method of claim 13, wherein the first bundled set of items consists of the first item wrapped at least in part by the first binding agent.

* * * * *